(12) United States Patent
Hosp

(10) Patent No.: US 10,853,890 B2
(45) Date of Patent: Dec. 1, 2020

(54) SOCIAL MEDIA TRANSACTION VISUALIZATION STRUCTURE

(71) Applicant: MasterCard International Incorporated, Purchase, NY (US)

(72) Inventor: Adam Kenneth Hosp, Lake St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 13/622,462

(22) Filed: Sep. 19, 2012

(65) Prior Publication Data
US 2014/0081750 A1 Mar. 20, 2014

(51) Int. Cl.
G06Q 30/02 (2012.01)
G06Q 50/00 (2012.01)
G06Q 30/06 (2012.01)

(52) U.S. Cl.
CPC ......... *G06Q 50/01* (2013.01); *G06Q 30/0207* (2013.01); *G06Q 30/0241* (2013.01); *G06Q 30/0631* (2013.01)

(58) Field of Classification Search
CPC ................................................ G06Q 30/0269
USPC ...................................................... 705/14.66
See application file for complete search history.

(56) References Cited

U.S. PATENT DOCUMENTS

| 7,099,831 | B2 | 8/2006 | Mitsuoka |
| 7,983,951 | B2 | 7/2011 | Frohwein et al. |
| 8,245,920 | B1 | 8/2012 | Katyal et al. |
| 8,250,096 | B2 | 8/2012 | Su et al. |
| 8,291,016 | B1 | 10/2012 | Whitney |
| 8,316,086 | B2 * | 11/2012 | Ufford ................. G06Q 10/107 705/319 |
| 8,407,148 | B2 | 3/2013 | Yoder et al. |
| 8,504,486 | B1 * | 8/2013 | Pinto ................. G06Q 30/0631 705/1.1 |
| 8,606,630 | B2 | 12/2013 | Fordyce, III et al. |
| 8,666,759 | B2 | 3/2014 | Eckert et al. |
| 8,738,418 | B2 | 5/2014 | Winters |
| 8,744,906 | B2 | 6/2014 | Fordyce, III et al. |

(Continued)

FOREIGN PATENT DOCUMENTS

| WO | WO/2014/047120 | 3/2014 |
| WO | WO/2014/047162 | 3/2014 |

OTHER PUBLICATIONS

Wiley Encyclopedia of Computer Science and Engineering (Year: 2009).*

(Continued)

*Primary Examiner* — Arthur Duran
*Assistant Examiner* — Breffni Baggot
(74) *Attorney, Agent, or Firm* — Otterstedt, Wallace & Kammer, LLP

(57) ABSTRACT

A database containing transaction data from at least one entity which makes payments with a payment network is maintained. Social network activity data from a social network is obtained for the at least one entity which makes payments with the payment network. The social network activity data and given records of the transaction data are integrated, to obtain integrated social media transaction visualization data. Techniques for providing purchase recommendations are also disclosed.

21 Claims, 16 Drawing Sheets

(56) References Cited

U.S. PATENT DOCUMENTS

| | | | |
|---|---|---|---|
| 9,710,822 B2* | 7/2017 | Berland | G06Q 10/087 |
| 2003/0163427 A1 | 8/2003 | Fung et al. | |
| 2005/0131757 A1* | 6/2005 | Chan | G06F 17/30867 |
| | | | 705/14.55 |
| 2005/0216300 A1 | 9/2005 | Appelman | |
| 2006/0212407 A1 | 9/2006 | Lyon | |
| 2007/0067297 A1* | 3/2007 | Kublickis | G06Q 30/02 |
| 2007/0168216 A1 | 7/2007 | Lemelson | |
| 2007/0255653 A1 | 11/2007 | Tumminaro et al. | |
| 2008/0005073 A1 | 1/2008 | Meek | |
| 2008/0147487 A1* | 6/2008 | Hirshberg | G06Q 30/02 |
| | | | 705/14.53 |
| 2009/0070228 A1 | 3/2009 | Ronen | |
| 2009/0119173 A1* | 5/2009 | Parsons | G06Q 10/107 |
| | | | 705/319 |
| 2009/0171686 A1* | 7/2009 | Eberstadt | G06Q 10/10 |
| | | | 705/319 |
| 2009/0172783 A1* | 7/2009 | Eberstadt | G06Q 10/107 |
| | | | 726/4 |
| 2009/0319516 A1* | 12/2009 | Igelman | G06Q 30/02 |
| 2010/0030578 A1* | 2/2010 | Siddique | G06Q 30/06 |
| | | | 705/3 |
| 2010/0088207 A1* | 4/2010 | McLaughlin | G06Q 20/04 |
| | | | 705/34 |
| 2010/0332330 A1* | 12/2010 | Goel | G06O 30/02 |
| | | | 705/14.66 |
| 2011/0055110 A1 | 3/2011 | Kolyvanov et al. | |
| 2011/0087550 A1 | 4/2011 | Fordyce, III et al. | |
| 2011/0093324 A1 | 4/2011 | Fordyce, III et al. | |
| 2011/0106607 A1 | 5/2011 | Alfonso et al. | |
| 2011/0125569 A1 | 5/2011 | Yoshimura | |
| 2011/0153414 A1* | 6/2011 | Elvekrog | G06Q 30/02 |
| | | | 705/14.43 |
| 2011/0246272 A1* | 10/2011 | Joa | G06Q 30/0215 |
| | | | 705/14.17 |
| 2011/0270763 A1 | 11/2011 | Graham, III et al. | |
| 2011/0302039 A1 | 12/2011 | Fordyce, III et al. | |
| 2012/0016731 A1* | 1/2012 | Smith | G06Q 20/20 |
| | | | 705/14.33 |
| 2012/0041879 A1 | 2/2012 | Kim | |
| 2012/0060106 A1* | 3/2012 | Moxley | G06F 17/30861 |
| | | | 715/758 |
| 2012/0089446 A1 | 4/2012 | Gupta | |
| 2012/0101881 A1* | 4/2012 | Taylor | G06Q 30/02 |
| | | | 705/14.13 |
| 2012/0143752 A1 | 6/2012 | Wong et al. | |
| 2012/0143761 A1* | 6/2012 | Doran | G06Q 20/40 |
| | | | 705/44 |
| 2012/0150598 A1 | 6/2012 | Griggs | |
| 2012/0158589 A1* | 6/2012 | Katzin | G06Q 20/22 |
| | | | 705/44 |
| 2012/0203632 A1 | 8/2012 | Blum | |
| 2012/0215604 A1* | 8/2012 | Canetto | G06Q 30/0214 |
| | | | 705/14.16 |
| 2012/0215610 A1 | 8/2012 | Amaro et al. | |
| 2012/0215724 A1* | 8/2012 | Ross | G06Q 30/00 |
| | | | 705/400 |
| 2012/0239479 A1 | 9/2012 | Amaro | |
| 2012/0239577 A1 | 9/2012 | Wolfs et al. | |
| 2012/0271691 A1 | 10/2012 | Hammad et al. | |
| 2012/0303425 A1* | 11/2012 | Katzin | G06Q 20/027 |
| | | | 705/14.4 |
| 2012/0323657 A1* | 12/2012 | Tiku | G06Q 30/0207 |
| | | | 705/14.17 |
| 2013/0031181 A1 | 1/2013 | Eberstadt | |
| 2013/0066782 A1 | 3/2013 | Diamond | |
| 2013/0085869 A1 | 4/2013 | Carlson et al. | |
| 2013/0085877 A1* | 4/2013 | Ruhrig | G06Q 20/02 |
| | | | 705/21 |
| 2013/0211913 A1* | 8/2013 | Ross | G06Q 30/02 |
| | | | 705/14.53 |
| 2013/0262209 A1 | 10/2013 | Boyer | |
| 2013/0304576 A1* | 11/2013 | Berland | G06Q 50/01 |
| | | | 705/14.53 |
| 2013/0346264 A1 | 12/2013 | Falkenborg et al. | |
| 2014/0058862 A1 | 2/2014 | Celkonas | |
| 2014/0067462 A1* | 3/2014 | Korosec | G06Q 30/0201 |
| | | | 705/7.29 |
| 2014/0081844 A1* | 3/2014 | Hosp | G06Q 20/02 |
| | | | 705/39 |
| 2014/0164083 A1 | 6/2014 | Wilkes | |
| 2015/0120472 A1 | 4/2015 | Aabye et al. | |

OTHER PUBLICATIONS

University of Chicago, "The Voice of the Customer", Abbie Griffin, Marketing Science vol. 12 No. 1, Winter (Year: 1993).*
Social Media Strategy Framework by Third Wave (Year: 2013).*
ISA/US, Authorized Office Shane Thomas, Written Opinion of the ISA, PCT/US13/60312, dated Jan. 10, 2014.
ISA/US, Authorized Office Shane Thomas, Written Opinion of the ISA, PCT/US13/60380, dated Feb. 28, 2014.

* cited by examiner

Enrollment on Add Payment Method Page

On Social Media Site

700

- General
- Security
- Notifications
- Apps
- Mobile
- Payments
- Ads

You can also visit your privacy preferences or edit your timeline to control who sees info there.

Search

Payments Settings

Add a credit card: — 702

First Name:
Last Name:
Credit Card Number:
Credit Card Type:
Expiration Date: Month / Year
Security Code (CSC): (?)
Billing Address:
Billing Address 2:
City/Town:
State/Province/Region:
Zip/ Postal Code:
Country: United States
Add

704

Share payment transactions in Social Media Site

Social Media Site will save your payment information for future purchases. You can always remove or manage this information in your account settings.

John Smith | Find Friends | Home

*Fig. 7*

SOCIAL MEDIA TRANSACTION VISUALIZATION STRUCTURE

FIELD OF THE INVENTION

The present invention relates generally to electronic commerce, and, more particularly, to electronic payment systems.

BACKGROUND OF THE INVENTION

The use of credit cards, debit cards, pre-paid cards, and similar non-card payment devices (e.g., appropriately configured smart phones) has become ubiquitous. People may use such cards and devices for many different types of purchases, including goods and/or services, and ranging from small to major purchases.

Social media includes web-based and mobile technologies used to turn communication into interactive dialogue. Examples include magazines, Internet forums, weblogs, social blogs, micro-blogging, wikis, podcasts, photographs or pictures, video, rating and social bookmarking. One particularly popular type of social media is the social networking site (e.g., Facebook).

SUMMARY OF THE INVENTION

Principles of the present invention provide techniques for a social media transaction visualization structure. An exemplary embodiment of a method for providing integrated social media transaction visualization data, according to one aspect of the invention, includes the steps of maintaining a database containing transaction data from at least one entity which makes payments with a payment network; obtaining social network activity data from a social network for the at least one entity which makes payments with the payment network; and integrating the social network activity data and given records of the transaction data, to obtain integrated social media transaction visualization data.

Furthermore, an exemplary method for providing purchase recommendations, according to another aspect of the invention, includes the steps of maintaining a database containing transaction data from at least first and second entities which make payments with a payment network; linking the transaction data from the at least first and second entities based on social media connectivity; and providing at least one purchase recommendation to the at least first entity which makes payments with the payment network based on the linked transaction data.

Aspects of the invention contemplate the method(s) performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein.

One or more embodiments of the invention can provide substantial beneficial technical effects. One non-limiting example is the linkage of transactional data to social media data for enhanced security—a transaction in a location that does not correlate with contemporaneous social media data may suggest a lost or stolen card or an attempt to commit fraud by an unscrupulous individual.

These and other features and advantages of the present invention will become apparent from the following detailed description of illustrative embodiments thereof, which is to be read in connection with the accompanying drawings.

BRIEF DESCRIPTION OF THE DRAWINGS

FIG. 7 presents a screen shot of exemplary consumer enrollment, at a social media web site's payment method page, according to an aspect of the invention;

DETAILED DESCRIPTION OF PREFERRED EMBODIMENTS

Figure 1:
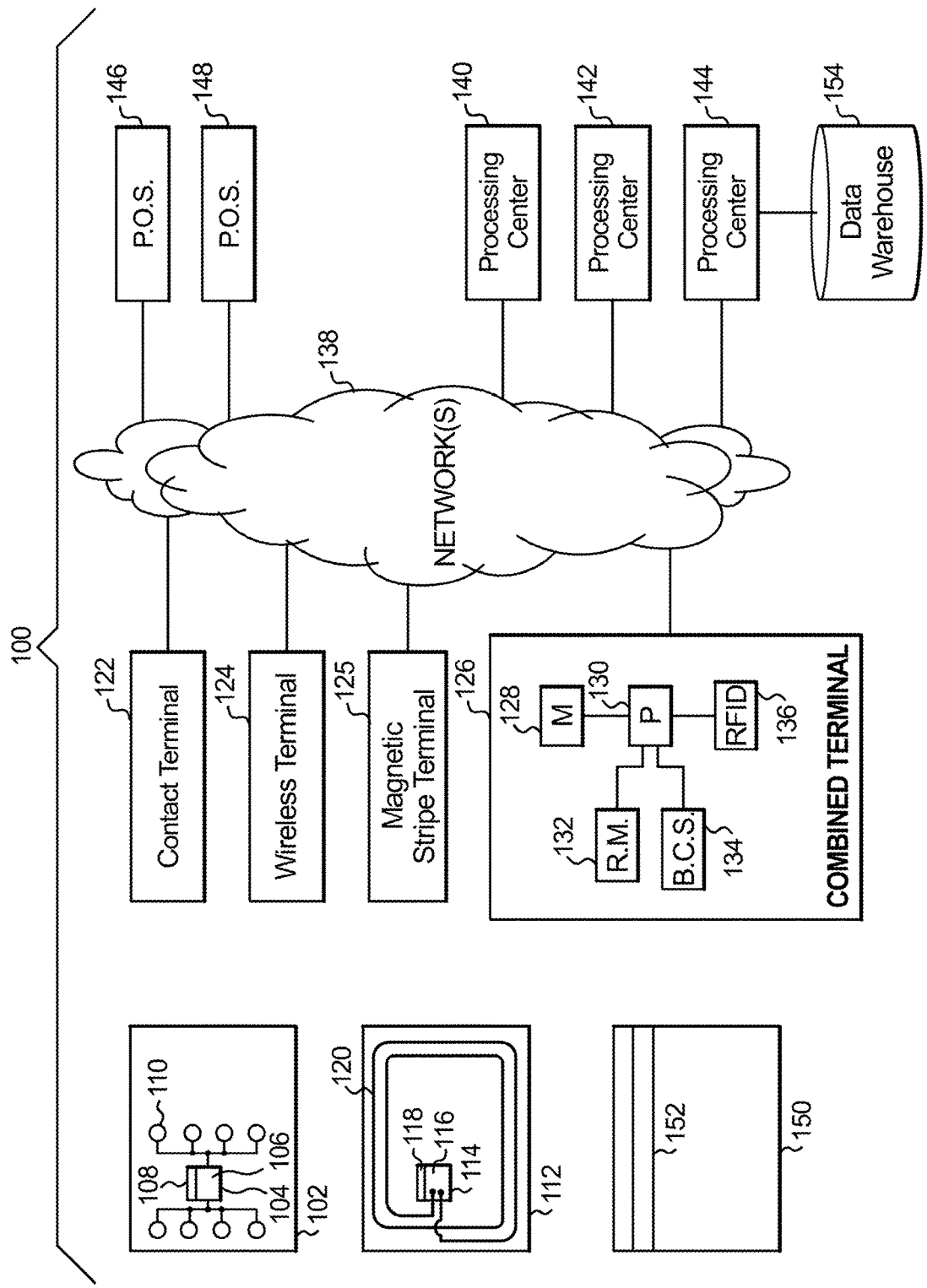
FIG. 1 shows a general example of a payment system that can implement techniques of the invention.

Attention should now be given to FIG. 1, which depicts an exemplary embodiment of a system 100, according to an aspect of the invention, and including various possible components of the system. It should be noted that while presentation of physical cards to terminals is described, one or more embodiments of the invention can also be used in connection with card-not-present transactions as well (e.g., Internet commerce transactions). System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. Other types of devices used in lieu of or in addition to "smart" or "chip" cards 102, 112 could include a conventional card 150 having a magnetic stripe 152, an appropriately configured cellular telephone handset, and the like. Indeed, techniques can be adapted to a variety of different types of cards, terminals, and other devices, configured, for example, according to a payment system standard (and/or specification).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used is the MULTOS® operating system licensed by MAOSCO Limited (MAOSCO Limited, St. Andrews House, The Links, Kelvin Close, Birchwood, Warrington, WA3 7PB, United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

As noted, cards 102, 112 are examples of a variety of payment devices that can be employed. The primary function of the payment devices may not be payment, for example, they may be cellular phone handsets. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more method steps. The applications can be, for example, application identifiers (AIDs) linked to software code in the form of firmware plus data in a card memory such as an electrically erasable programmable read-only memory (EEPROM). Again, note that "smart" or "chip" cards are not necessarily required and a conventional magnetic stripe card can be employed; furthermore, as noted above, one or more embodiments are also useful in the context of card-not-present transaction, including Internet transactions.

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (for example, a virtual private network, such as the BANKNET® virtual private network (VPN) of MasterCard International Incorporated of Purchase, N.Y., USA). More than one network could be employed to connect different elements of the system. More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device (or processing functionality of other entities discussed in other figures herein, such as processing capability of an operator of a payment network).

Many different retail or other establishments, as well as other entities, generally represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

Again, conventional magnetic stripe cards 150 can be used instead of or together with "smart" or "chip" cards, and again, in addition to physical cards and other physical payment devices, one or more embodiments are also useful in the context of card-not-present transactions, such as Internet transactions.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128, which then contactlessly transmits the electronic data to the proximity IC chip in the card 112 or other wireless device. Magnetic stripe cards can be swiped in a well-known manner. Again, in some instances, the card number is simply provided via web site, in a card-not present transaction, or the like.

One or more of the processing centers 140, 142, 144 can include a database such as a data warehouse 154.

In Internet or other card-not-present transactions, the card or other device is not presented to terminal 122, 124, 125, or 126. Rather, appropriate card information (e.g., primary account number (PAN), cardholder name, cardholder address, expiration date, and/or security code, and so on) is provided to a merchant by a consumer using a web site, telephone, or the like. The merchant then uses this information to initiate the authorization process. Some embodiments employ an e-wallet, which is useful, for example, in connection with card-not-present Internet transactions.

Figure 2:
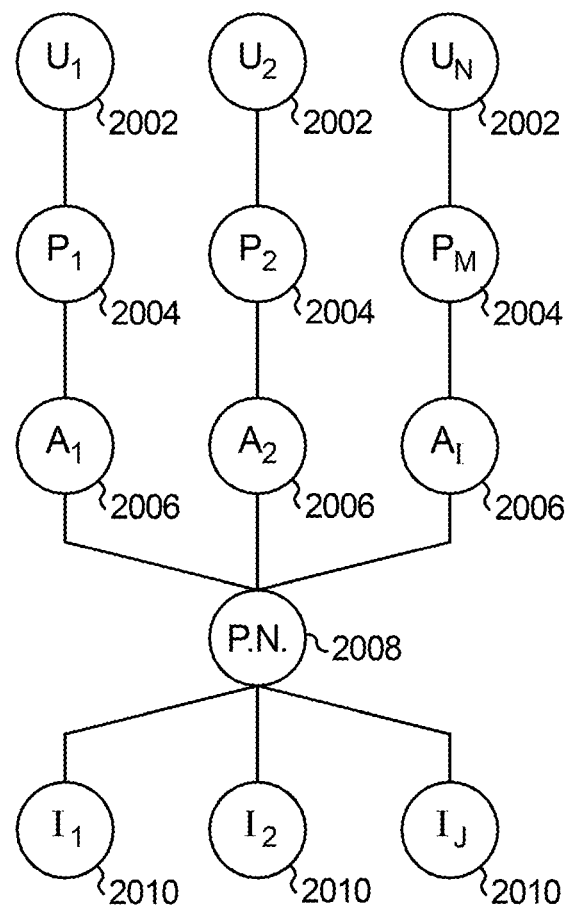
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g., consumers such as on-line shoppers) 2002, $U_1$, $U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. During Internet commerce, for example, the cardholder may simply provide the card number, expiration date, security code, and/or other pieces of data described above to the merchant, who prepares an authorization request based upon same without actually seeing the physical card. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. A wide variety of other types of payment networks can be used. For example, some embodiments of the invention may be employed with proprietary or closed payments networks with only a single issuer and acquirer; with mobile networks; and/or with various types of electronic wallet services in conjunction with a suitable payment network.

Figure 3:
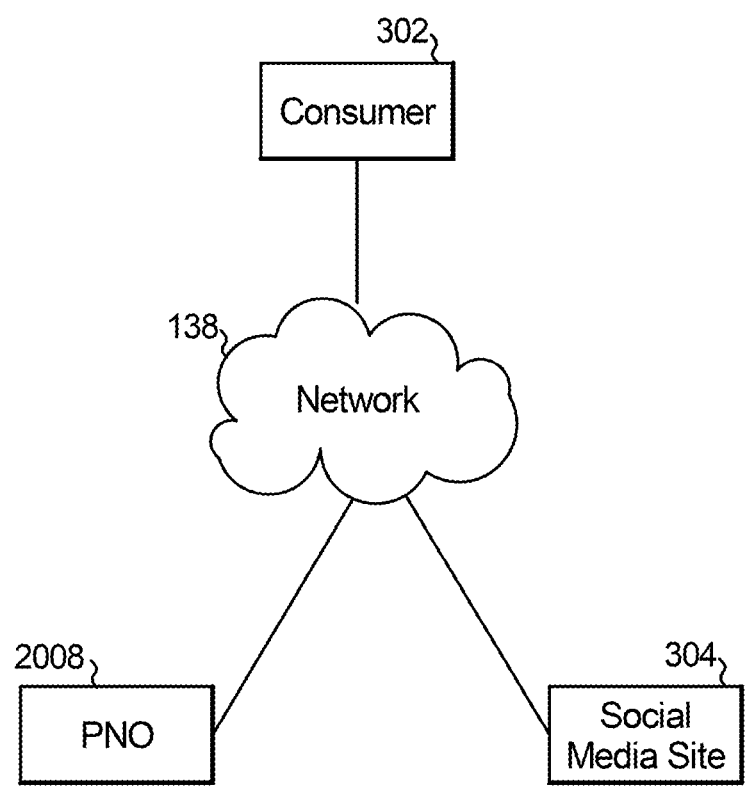
FIG. 3 depicts exemplary interaction of a consumer with a payment network operator and a social media site, via a network, according to an aspect of the invention.

Referring to FIG. 3, one or more embodiments empower the consumer 302 to socialize (publish and share) his or her payment transactions on a social media web site 304 using social media web site sharing venues, such as wall, timeline, places, merchant pages, and the like. Non-limiting examples of social networking services include FACEBOOK® (registered mark of Facebook Inc., Menlo Park, Calif., USA) and GOOGLE+® (registered mark of Google Inc., Mountain View, Calif., USA). The payment transactions may be carried out, for example, with the aid of an operator 2008 of a payment network (PNO). The entities may communicate via one or more networks such as network 138. PNO 2008 is generally representative of payment network operators, regardless of whether they connect multiple issuers and acquirers as shown in FIG. 2. In one or more embodiments, after initial enrollment, configuration and opt-in, the consumer may take further action to socialize his or her payments transactions (but is not obligated to do so).

Figure 4:
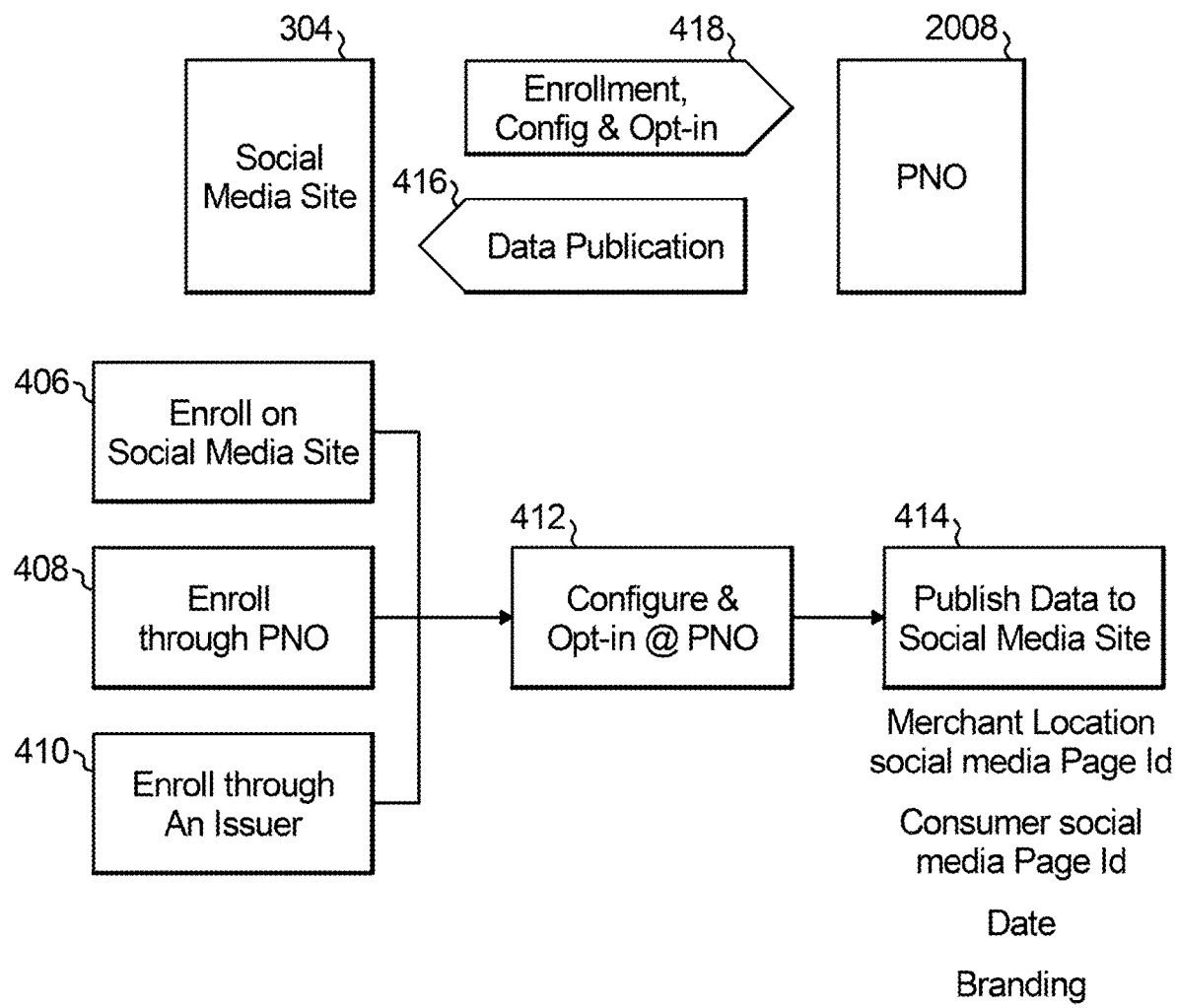
FIG. 4 depicts an exemplary consumer experience, including enrollment, configuration, opt-in, and publication, according to an aspect of the invention.

Referring now to FIG. 4, in one or more embodiments, consumer processes include enrollment, as at 406, 408, 410; and use, discussed further below. In enrollment, consumer 302 decides to participate. This may involve, for example, agreeing to legal terms with PNO 2008 and the operator of social media site 304 (SMSO). In general, this may involves a unified process or two separate processes, one with the operator of social media site 304 and one with PNO 2008. The consumer may agree, for example, to allow PNO 2008 to push his or her payment data to SMSO 304 and to allow others to see this data on site 304. Note that, for convenience, reference character 304 is used to refer to the site and its operator and reference character 2008 is used to refer to the network and its operator. Attention should also be given to FIG. 5. Partial screen shot 506 depicts a query box with response buttons 516, 518 where the consumer may elect whether he or she wishes to opt-in to information sharing.

As seen at 502, in addition to the opt-in process, the consumer may decide to configure what subset of transactions he or she wishes to be posted to site 304. In the non-limiting example of FIG. 5, these include DINING, RETAIL, TRAVEL, and DIGITAL. The user is allowed to turn each category on or off with an associated button (not separately numbered to avoid clutter). The final choices can be saved with button 510 or cleared to start again with button 508. The user may wish to publish all or only part (a subset) of his or her transactions. View 502 represents one logical grouping of transactions by types of categories, from which the user can pick which categories he or she wants to have published. Other categories, additional categories, or other methods of selection could be employed in other embodiments. For example, the consumer may want to share restaurants and allow PNO 2008 to publish date, time, and location of any restaurant anywhere in the world. This could also include, for example, an attached map or other application or feature so people can find the restaurant. An opportunity could also be afforded for the cardholder to enter a review of his or her dinner experience. A link could be provided to other sources of reviews for the restaurant on the Internet (for example, the FOURSQUARE® location-based social networking web site (registered mark of Foursquare Labs, Inc., New York, N.Y., USA). Alternatively, instead of restaurants, the user may elect to publish travel-related transactions. This aspect might also include restaurants if they are identified as related to travel. Some people might even elect to publish their grocery shopping. In any event, the consumer configures the type of data he or she wants to share.

As shown at screen shot 504, the user may also be afforded an opportunity related to the target for publication at the site 304. Purchase data to be shared can be shared in a variety of contexts such as a wall, a timeline, or places. The user is allowed to turn each category on or off with an associated button (not separately numbered to avoid clutter). The final choices can be saved with button 514 or cleared to start again with button 512.

In the enrollment process, consumers may interact with site 304, for example, by calling up an application program interface (API) over network 138 such as the Internet; that API enables the kind of interaction just described.

As used herein, the "Internet" capitalized refers to a global system of interconnected computer networks that use the standard Internet protocol suite (often called TCP/IP) to serve users worldwide; the Internet is a network of networks. On the other hand, the term "internet" when not capitalized refers to any system of interconnected computer networks, including the Internet and other internetworks.

Figure 5:
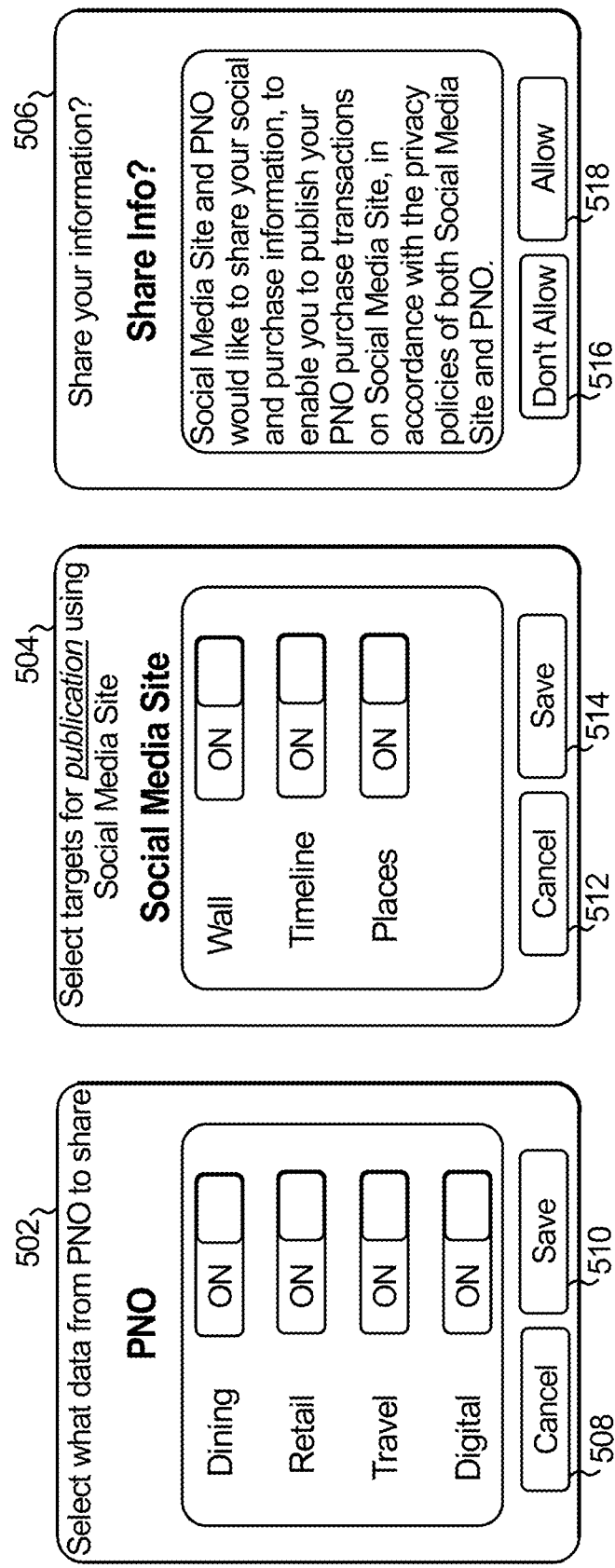
FIG. 5 depicts more details of exemplary configuration and opt-in processes, according to an aspect of the invention.

Any of the options shown in FIG. 5, or similar options, can be changed over time. That is to say, the consumer may change his or her preferences as to what types of transactions will be shared, where they will be shared, or whether they are to be shared at all; or the options offered to the user (e.g., actual categories that can be selected from) may change over time, or both. In one or more embodiments, these aspects are enabled and controlled via a technology connection between SMSO 304 and PNO 2008; for example, by API or the like. In one or more embodiments, an application on site 304 invokes an API to the PNO's infrastructure. This API displays the consumer choices. As the consumer makes selections within site 304, those are piped back to PNO 2008. The selections can, for example, be saved in a data warehouse 154 at that time.

In at least some instances, Internet technologies such as transmission control protocol/internet protocol (TCP/IP) are employed for communication between the consumer 302 and site 304 and between site 304 and PNO 2008. APIs can be written, for example, in one of the third generation languages such as C++, Perl, JSON, or the like.

Thus, referring back to FIG. 4, enrollment can be carried out in a variety of ways; for example, at the site 304, as shown at 406; via the PNO 2008, as shown at 408; or via an issuer 2010, as shown at 410. As alluded to above, there may be some payment data that will not be shared even if the consumer does consent; for example, health care transactions. PNO 2008 might deem it to be against policy or otherwise inappropriate. Thus, consumer 302 may be afforded many options but some may be restricted for legal or policy reasons or the like. Stated in another way, there is preferably no sharing without the consumer's consent, and some data may not be appropriate to share even with the consumer's consent. As seen at 412, configuration and opt-in may be carried out, for example, via PNO 2008. As shown at 414, once all is in readiness, publication of data to the site 304 may commence. Such data can include, for example, the merchant's location, the merchant's social media page identifier, the consumer's social media page identifier, the date, and branding information (i.e., what type of card was used for the transaction, also referred to as card type or logo; or indeed any other brand in the payment chain—merchant brand, other payment intermediaries (e.g., wallet providers), and the like). In general, different amounts of information may be published. In some cases, less information could be provided; for example, only the merchant's social media page identifier, the consumer's social media page identifier, the date, and branding information. On the other hand, in other cases, more information could be provided; for example, a full transaction stream such as merchant identifier (non-limiting examples include merchant ID (MID), card acceptor ID, and acquiring ID), transaction identifier, date, time, merchant category code, amount, merchant's name and address, consumer's information, as well as the information already mentioned.

Thus, as shown by arrows 416, 418, in some embodiments, enrollment, configuration, and opt-in may be effectuated (or otherwise facilitated) by PNO 2008 while publication takes place at site 304.

Figure 6:
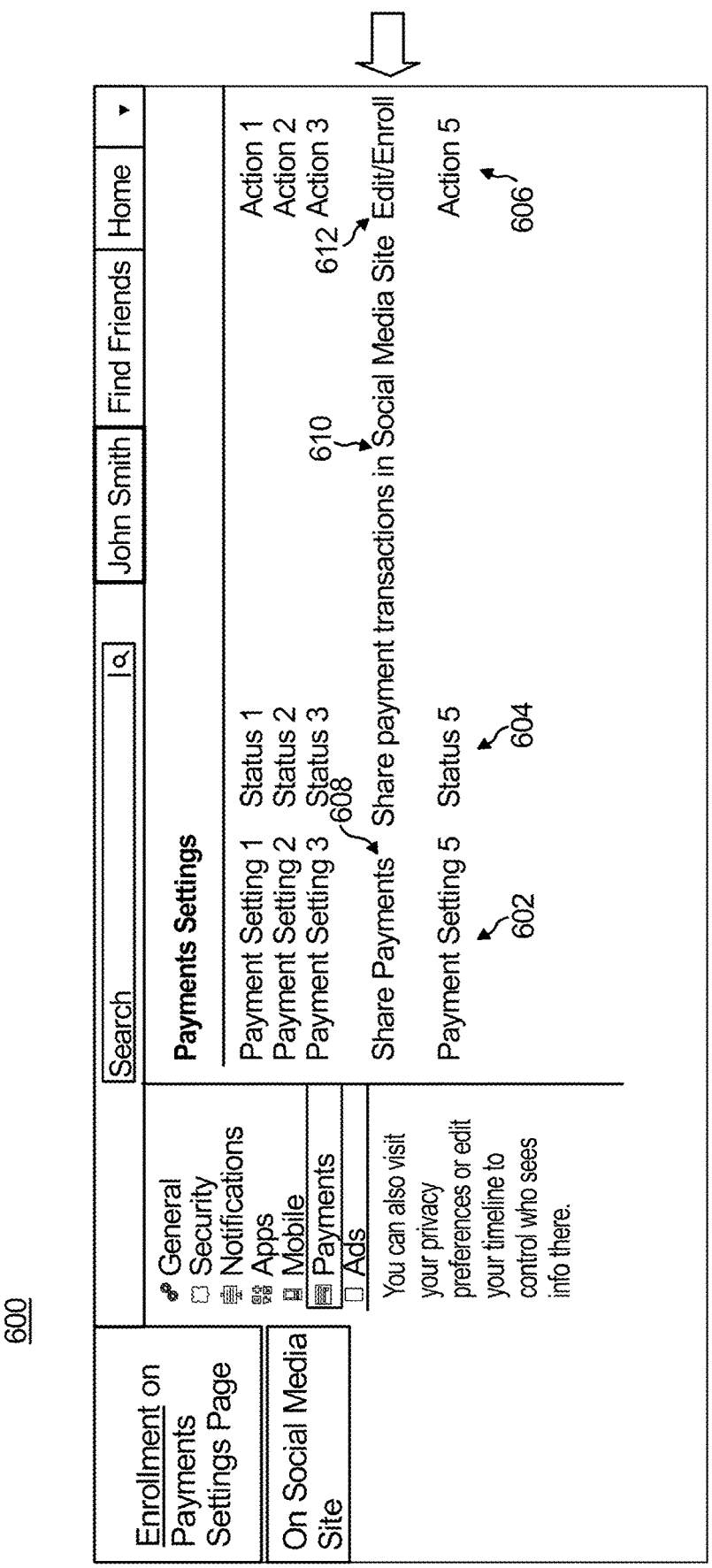
FIG. 6 presents a screen shot of exemplary consumer enrollment, at a social media web site's payments settings page, according to an aspect of the invention.

Further non-limiting exemplary aspects of enrollment will now be discussed with respect to FIGS. 6-8. FIG. 6 presents a screen shot of exemplary consumer enrollment at a social media web site's payments settings page 600. Page 600 may afford the user a plurality of payments settings 602 shown generically as payments settings 1 through 3 and 5; examples include a balance, a purchase history, different payment methods available, and preferred currency. The status of the different settings may be shown at 604 (e.g., value of the balance, what the current preferred currency is). Available options may be shown at 606 (e.g., view history, change preferred currency). One of the settings could be a "share payments" option 608, shown in lieu of generic option 4. As indicated in the status portion 610, this setting 608 allows sharing payments transactions on site 304. As seen at 612, the available actions are enrolling or editing.

FIG. 7 presents a screen shot of exemplary consumer enrollment at a social media web site's payment method page 700. A dialog region 702 allows the user to enter a new credit card or the like, or edit an existing one. As part of the dialog, the user is allowed to check a box 704 to opt-in to sharing of payment data with site 304.

Figure 8:
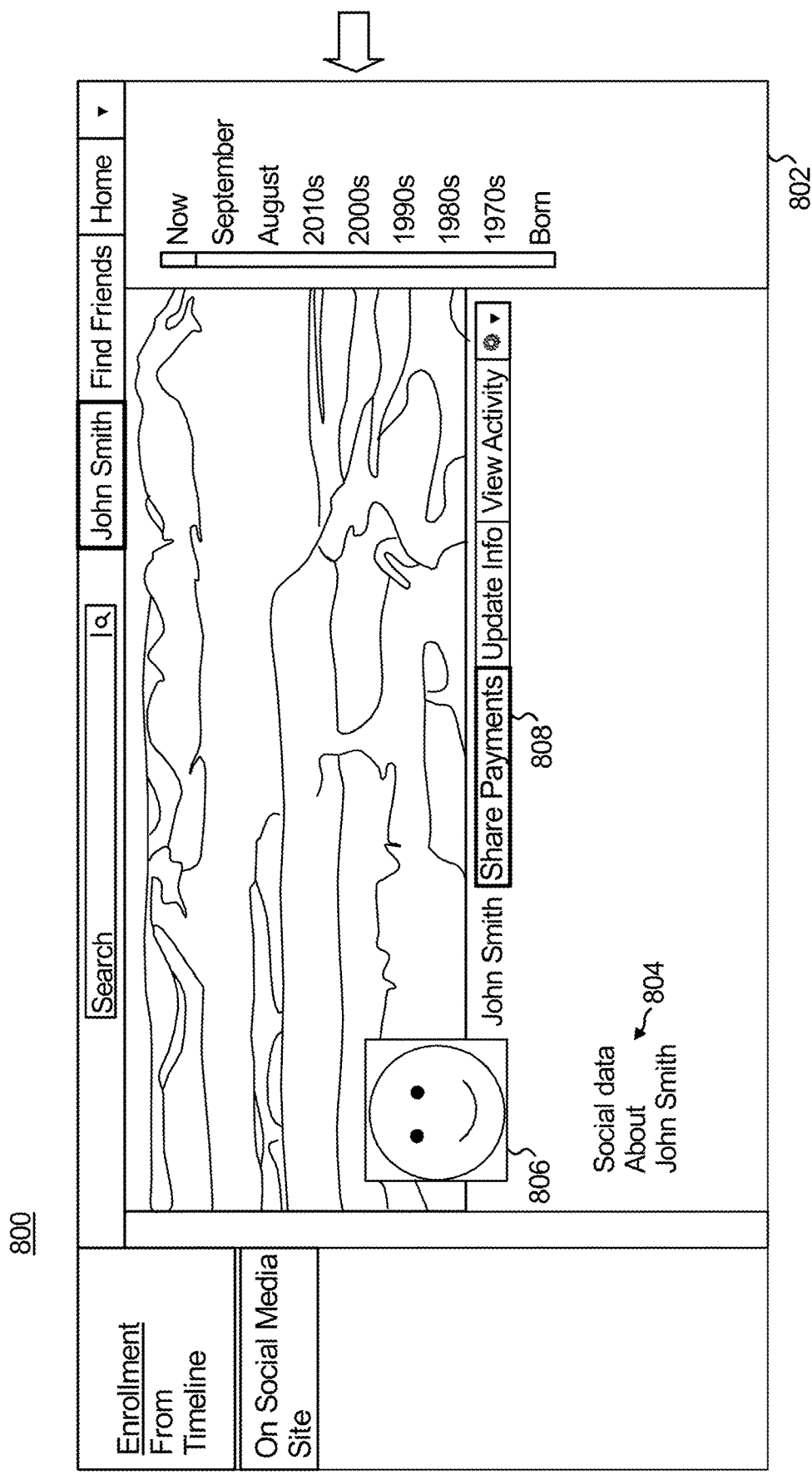
FIG. 8 presents a screen shot of exemplary consumer enrollment, at a social media web site's timeline page, according to an aspect of the invention.

FIG. 8 presents a screen shot of exemplary consumer enrollment at a social media web site's timeline page 800. Page 800 can include, for example, an image 806 of the user (shown as a generic "smiley face" for illustrative convenience); various social data about the user, as at 804 (e.g., professional data, family data, educational data); and a timeline 802. A link 808 to "share payments," which links to one or more enrollment/opt-in screens, may also be provided.

It will be appreciated that one or more embodiments benefit the consumer by allowing SMSO 304 to enhance its user experience by enabling its members to socialize (publish) selected payment transaction data to their profiles.

Various types of data feeds can be employed. In some instances, a consumer's raw transaction data (with appropriate consents) can be provided from PNO 2008 to site 304. In general, options could include, for example, raw data feed; limited data feed; or creation of a private application (e.g., customized based on interests, age, organization membership, etc.) by PNO 2008. Furthermore in this regard, in one or more embodiments, the consumer has the ability to include or exclude whatever types of data are to be shared (publicly or privately) with a social media site. For example, the consumer may want to share what restaurants he or she patronizes, and his or her comments about the merits of those restaurants (or may only want to share restaurant data for restaurants in a certain geographic location); or may want to share airline ticket information. However, the consumer may not wish to share data on grocery stores, gasoline filling stations, and so on. A variety of options may be provided to enable the desired filtering, such that the data feed to the social media site includes only that information which the consumer wishes to share. Data could also be obtained, for example, from other providers, such as issuers 2010, acquirers 2006, processors (entities that carry out processing on behalf of other entities such as issuers), or the like. Further examples of data that the consumer might choose to share include itinerary data, item level data (e.g., SKU or stock keeping unit), and so on. These data feeds may be obtained from a variety of sources, in one or more embodiments, including third parties other than the payment network operator (issuers, acquirers, other data providers with itineraries, folio-level data, SKU-level data, and the like).

Non-limiting examples of data that can be exchanged include Merchant's Social Media Site Page ID; Consumer's Social Media Site Page ID; Transaction Date; and Associated Logo (e.g., logo of the card used to make the transaction, or indeed of any other brand in the payment chain—merchant brand, other payment intermediaries (e.g., wallet providers), and the like)). PNO 2008 may be provided with access to features of site 304, such as a social graph, for enrolled consumers. In some cases, SMSO 304 and PNO 2008 host an enrollment and de-enrollment process with consumer consents; while PNO 2008 hosts the configuration. Opt-in consent may be obtained in a variety of ways. For example, in some instances, SMSO 304 obtains two opt-in consents from cardholders (one for the benefit of the SMSO; one for the PNO).

Appropriate usage limits are preferably placed on use of the published data. Appropriate age limits are preferably enforced on those enrolling for data sharing. Of course, all applicable laws, rules, regulations, policies and procedures with respect to age of consumers, privacy, and the like should always be fully complied with.

In some instances, a payment-source specific logo is supported by SMSO 304; for example, a MASTERCARD logo is displayed in connection with MasterCard card purchases, a VISA logo in connection with VISA card purchases, and so on.

Various appropriate arrangements can be made between SMSO 304 and PNO 2008 with regard to advertising placement, advertising revenue sharing, offering of products of PNO 2008 to merchants or other parties signed up with site 304, and so on.

As noted, in some instances, PNO 2008 develops a suitable application which accesses programming of SMSO 304 via appropriate APIs. Further details are provided below in connection with the description of FIGS. 13 and/or 16.

Figure 9:
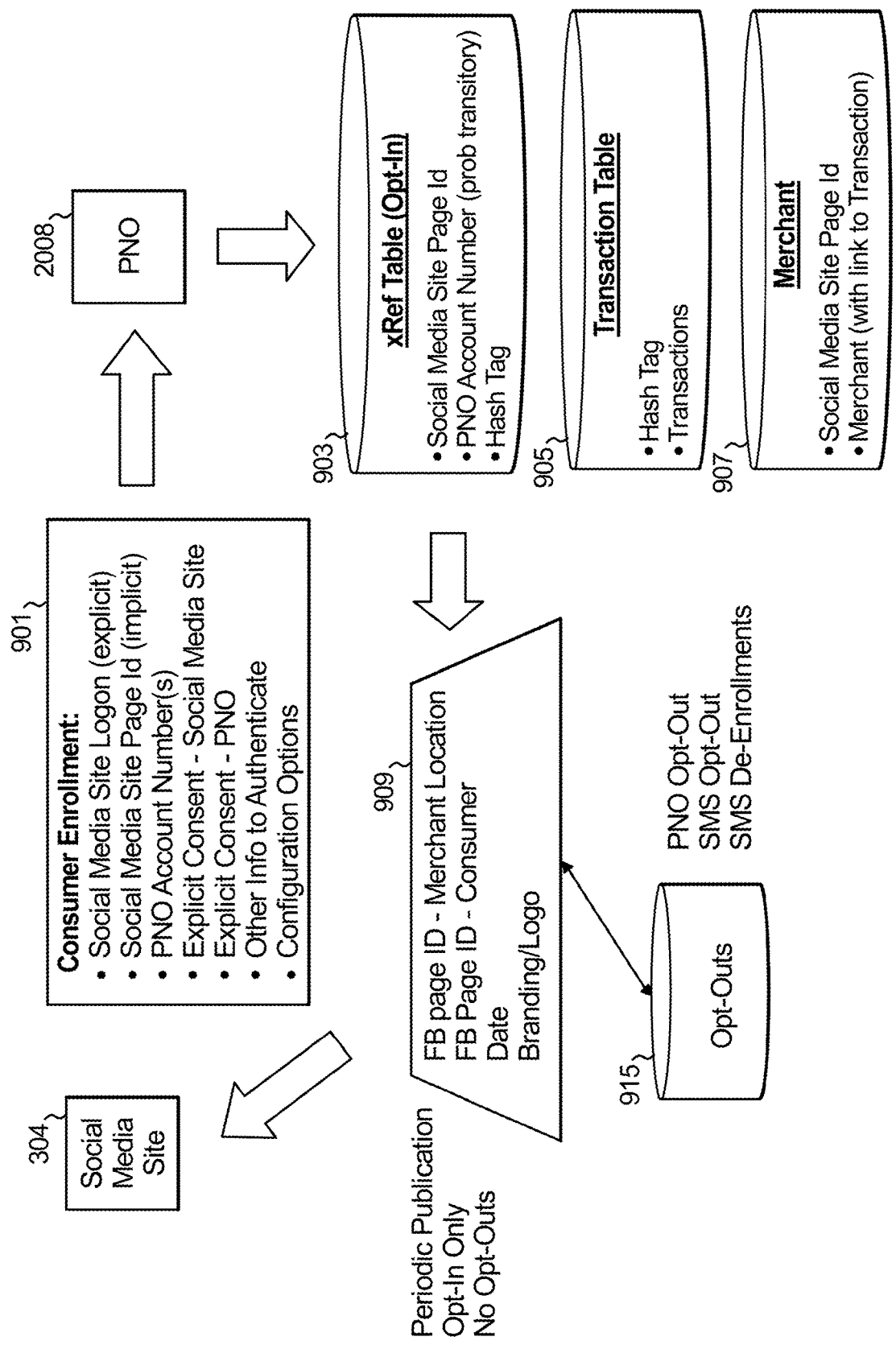
FIG. 9 depicts an exemplary enrollment and publication data flow, according to an aspect of the invention.

Referring now to FIG. 9, consumer enrollment 901 can include information provided to the PNO 2008. Such information can include the Social Media Site Page ID (explicit—consumer opts in and links to one or more payment card numbers), Social Media Site Page ID (implicit—there are typically page IDs associated with the consumer's social media site page and with every application—these are typically not explicitly recognized by the consumer—these are used to publish material to the social media site and may be a portion of a URL and/or a link to a database of the social media site), PNO Account Number(s) (PANs of one or more pre-registered cards for which it is desired to share transaction data), and the like. In one or more embodiments, explicit consumer consent is obtained at the Social Media Site 304 and/or a site of the PNO 2008, for the benefit of both the SMSO and PNO. Optionally, other information may be gathered for authentication purposes (authentication process to confirm that the person providing the consent is who he or she purports to be; e.g., identity, password, optionally multifactor authentication, and the like). The above-discussed configuration options can be saved.

The PNO 2008 may set up various data structures as shown at 903, 905, and 907. Data structure 903 is an opt-in cross reference table. It includes, for those who have opted in, the social media site page identifier, the PNO account number, and a suitable hash tag (anonymous/secure identifier so PAN can't be mis-used). Transaction table 905 includes, for each aforementioned hash tag, the pertinent transaction data. Merchant data structure 907 includes, for each merchant, the merchant's social media site page identifier and a link to the transaction(s) using appropriate merchant and transaction identifiers to link the card account(s) to the merchant(s) as discussed above. In one or more embodiments, the data in tables 903, 905, 907 is distilled down to a subset 909, including the merchant's social media page identifier, the consumer's social media page identifier, the date, and branding information, as discussed above. This filtering process is also informed by interaction with opt-out database 915. Information 909 is only published to site 304 after removing data from anyone who has opted out or de-enrolled via site 304 or PNO 2008. Database 915 can be populated, for example, via a web site or call center that allows consumers, and optionally, payment networks, merchants, and any other participants, to provide or withhold participation consent in whole or in part. It should be noted that the terminology "opt out" is not meant to suggest that personal data is ever employed without an affirmative consent from the person who is the subject of the data—indeed, it is preferred that no sharing occurs without the consent of the consumer or other individual.

Thus, following enrollment, PNO 2008 may set up a data warehouse 154 including a variety of filters which will collect transactions. In other words, when the consumer enrolls, the enrollment process effectively creates a profile. That profile is put into the data warehouse, preferably in a special section thereof, and is used to filter transactions. The filtered transactions are collected and provided to the SMSO in the SMSO's environment. That is, data that meets the criteria is served up and published to the SMSO in one of a variety of ways. During enrollment, as noted, the consumer may select how he or she wants his or her data shown on site 304. One non-limiting example is publishing transactions to a so-called timeline or wall (collection of the photos, stories, and experiences that tell an individual's story); another example is publishing transactions to a so-called circle (data structure which enables users to organize people into groups for sharing). In some instances, with suitable consent, the data is also published to a data warehouse associated with the SMSO 304; for example, to allow the SMSO to use it to generate advertisements, offers, or the like.

It is worth distinguishing the ongoing publication processes from the subsequent use processes (even though publication and use may be happening simultaneously).

A variety of techniques can be used to publish data to the relevant section(s) of social network(s). In some instance, utilizing appropriate profile data, data is pulled from the data warehouse 154 of the PNO 2008 and pushed to the target market (site 304) over the Internet. In some instances, an RSS type feed to site 304 can be employed or an API of the SMSO is used to push the data onto site 304. Refer to discussion of FIGS. 13 and/or 16 below.

Considering again the configuration aspect, amending the configuration may be carried out in some instances when change is desired. For example, the user may not want to publish all restaurants any more, just travel-related transactions. The user can call back the enrollment process and modify the way his or her configuration is working to reflect the desired items to share. This can include, for example, deleting all prior posts; keeping old posts but not sharing new posts going forward; stopping sharing altogether and deleting everything; or keeping on sharing but using new filters. Reconfiguration is essentially the same as enrollment except the user modifies what he or she did previously and has the option to delete data going backwards.

A variety of subsequent uses may be made of the data, subject, of course, to appropriate consent. In this regard, tying together social data with payment data is believed to be quite significant and advantageous. One suitable subsequent use of data is targeted advertising. For example, based on the subject's purchasing history, it may be determined that the subject is interested in travel but not hair care products; further, it may be determined, based on the history, that the subject is interested in both business and family travel. Social commentary of the subject may also be employed in targeting. For example, suppose the subject has commented favorably on Airline B but unfavorably on Airline A. An offer could be provided related to Airline C which draws a fruitful comparison to Airline B or a significant distinction from Airline A. Other potential subsequent uses include utilizing the data in follow-on processes such as tax preparation (e.g., integration with the social media site helps to identify expenditures as business-related or personal); providing advice (e.g., making user aware of offers, suggestions, or alerts, based on past single data points and/or past patterns), etc.

Figure 10:
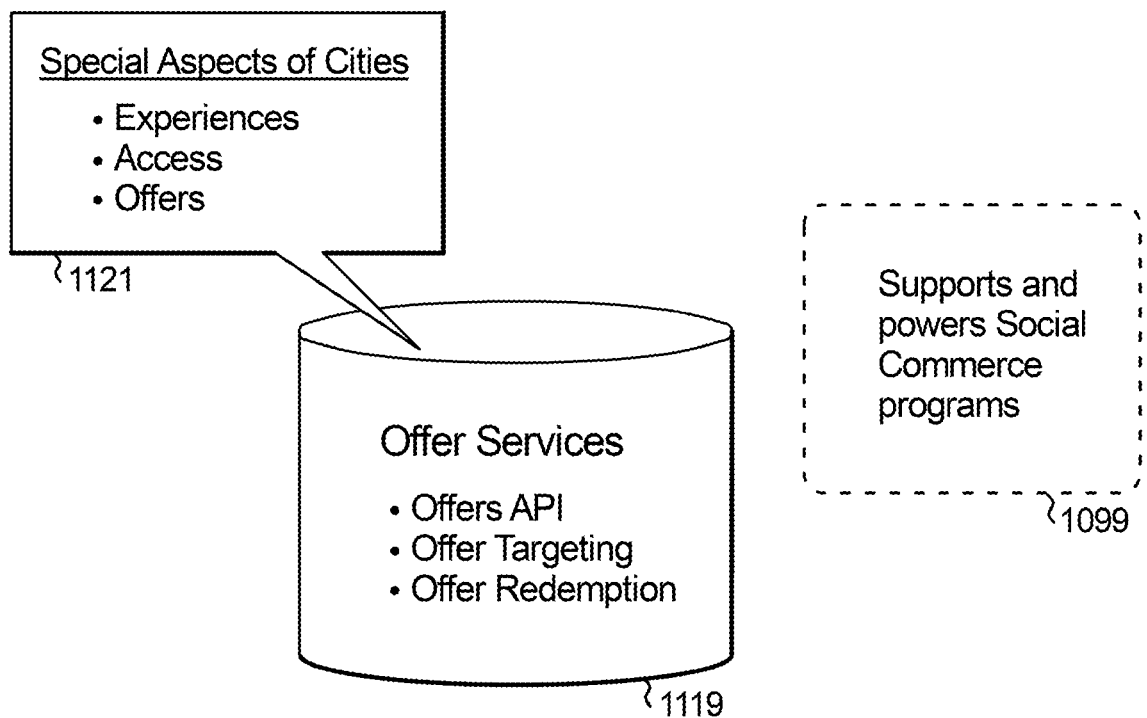
FIG. 10 depicts an exemplary "low integration" embodiment, according to an aspect of the invention.

FIG. 10 shows an exemplary "low integration" embodiment wherein the PNO 2008 and SMSO 304 are relatively less integrated than in the high integration approach discussed below. PNO 2008 may provide offer services 1119. This may be in the form of a web service such as a web API or the like. A database of offers may be maintained by service 1119 together with suitable business logic for offer targeting and offer redemption. As shown at 1121, non-limiting examples of offers include special deals such as special experiences, special access, or special offers; the same may be linked to a particular city, other geographical area, or by some other criteria. In the low integration approach, as seen at 1099, PNO 2008 supports and powers social commerce programs such as special travel-related offers, deals, and experiences; shopping-related blogs or web sites; and so on.

Figure 11:
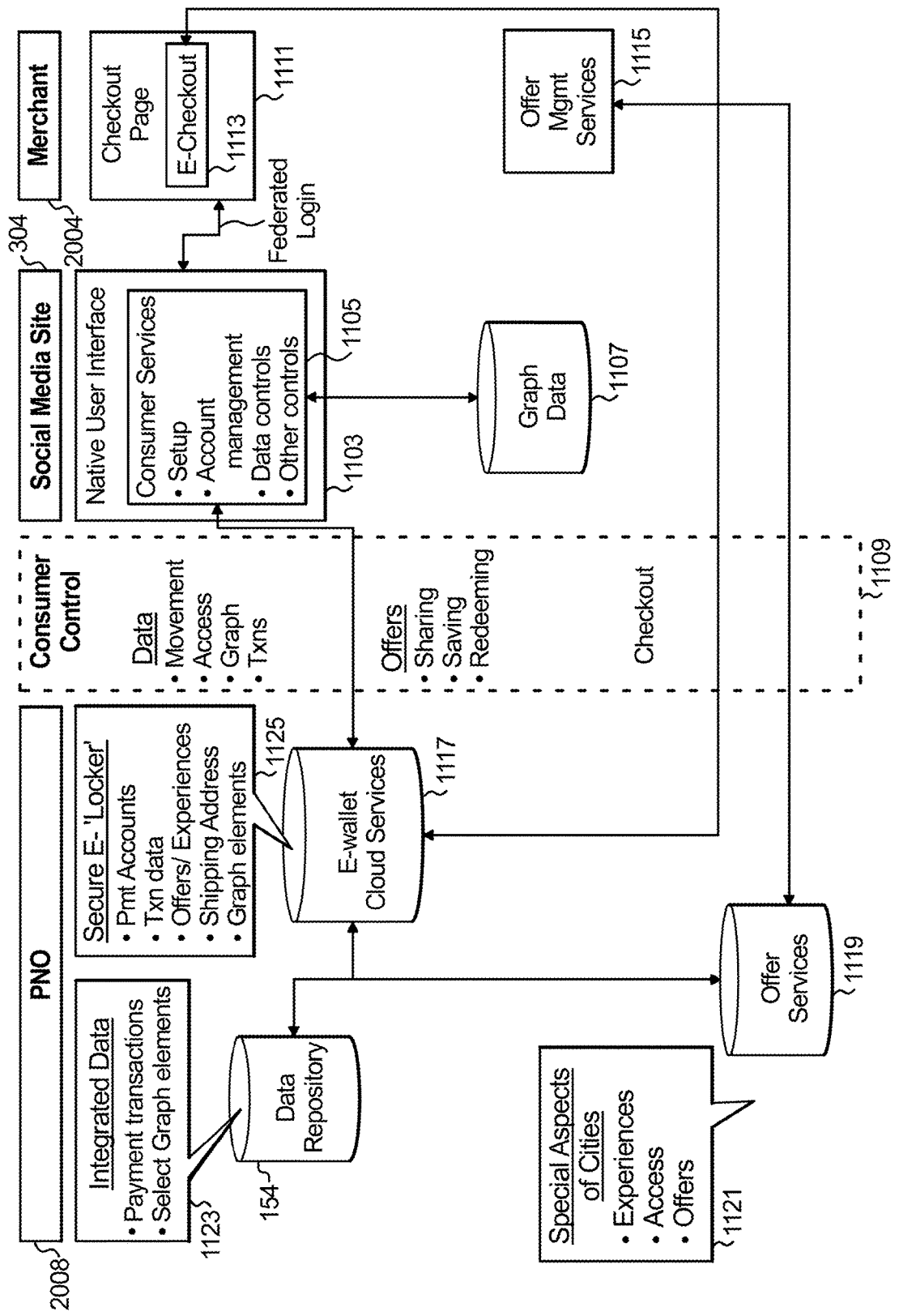
FIG. 11 depicts an exemplary "high integration" embodiment, closely integrated with an electronic wallet, according to an aspect of the invention.

FIG. 11 depicts an exemplary "high integration" embodiment, closely integrated with an electronic payments wallet. Furthermore in this regard, with the growth of Internet commerce, the electronic wallet (e-wallet), also known as a digital wallet, has been developed. An e-wallet provides consumers with a secure and convenient way to pay for purchases from accepting on-line merchants. Upon registration, consumers may store their card, billing and shipping information on a site hosted by a suitable entity, and may access that information to pay conveniently and securely across participating merchants. The e-wallet platform may, in some instances, deliver additional security with the use of "virtual" account numbers to mask cardholders' real information. The consumer enters one or more debit and/or credit cards or the like in the e-wallet and makes payments on line. Use of an e-payments wallet inside site 304 enables data sharing in a native way. In at least some instances, instead of back and forth communications using APIs, at least some aspects of one or more embodiments are implemented within and/or facilitated by a suitable e-wallet.

With continued reference to FIG. 11, PNO 2008 may provide an e-wallet; for example, as a cloud computing service, as shown at 1117. Within e-wallet 1117, there will typically be a wallet of different credit, debit, or charge cards, e.g., MASTERCARD® cards (registered mark of MasterCard International Incorporated, Purchase, N.Y., USA); VISA® cards (registered mark of VISA International Service Association, Foster City, Calif., USA); DISCOVER® cards (registered mark of Discover Financial Services Corporation, Riverwoods, Ill., USA); or AMERICAN EXPRESS® cards (registered mark of American Express Company, New York, N.Y., USA). When the consumer configures the wallet for transactions (for example, with a brand of payment card corresponding to PNO 2008, such as MASTERCARD brand) he or she configures exactly which types of transactions he or she wants to share in the SMSO's social graph or the like. In this embodiment, the wallet can implement the above-discussed configuration aspects. Data repository 154 can be implemented, for example, as a data warehouse of PNO 2008. As seen at 1123, it includes all the payment transactions and adds any of the social graph elements 1107 (or similar social data) being discovered form the social network 304. Payments locker 1125 is where the different payment accounts are located. It also references back to the transaction data in the data repository 154 so each individual consumer can see old transaction data. Offers associated with the transaction data are also present in the locker 1125, including desired shipping addresses or the like. The payments locker 1125 can be provided, for example, by electronic wallet cloud-based services 1117. The offers and experiences come from offer services 1119 as discussed above. Examples of offers including special deals such as special experiences, special access, or the like were discussed above in connection with block 1121. As the various offers are developed, there will be various associated parameters and the like. For example, an exemplary parameter could be the fact that the consumer shopped at a big box retailer and purchased lumber; in response, the consumer receives an offer for a portable electric drill. Conversely, if the consumer did not shop at such a store, such an offer is not generated. Offer services database 1119 is thus a database of many different kinds of offers that are available to particular consumers. The offers are matched against various criteria (for example, in data repository 154) to determine if the given consumer is eligible for the particular offer.

In the exemplary embodiment of FIG. 11, everything in the column under PNO 2008 is held, managed, and controlled by PNO 2008, and is preferably secured using appropriate security techniques. Now consider column 1109 labeled "Consumer Control." This illustrates movement of the data. Data from the PNO's environment, shown under PNO 2008, is made available in other environments; e.g., a social network environment 304. Consumer control 1109 defines what data the consumer wants to publish to social network 304. Consumer control 1109 also provides control regarding what data flows from the social network 304 back to the PNO 2008 (e.g., social graph data, such as when a consumer performs a check-in at a certain location; who the consumer is linked to; all of his or her friends; and the like—the consumer decides if PNO 2008 is allowed to see his or her friends, see photos in his or her photo album, when he or she checks in, and so on). If permitted, this data flows back from social network 304 to PNO 2008. Similarly, as discussed above, the consumer can elect to publish, for example, all restaurant transactions, in which case that data flows from PNO 2008 to social network 304.

The column under the social media site 304 represents the entire social network environment; whether it is a wall, timeline, or the like. Here, there is a native user interface (UI) 1103 physically within the social network environment. It is built with social network APIs. It appears to the user as a social network application when the user is using it in the social network; for example, checking boxes, clicking options, etc., to indicate the consumer's choices for what data flow is allowed in both directions. As seen at 1105, consumer services that may be offered include setup, account management, data controls, offer controls, and the like. Graph data 1107 is a non-limiting example of social networking data.

Consider the rightmost column under merchant 2004. If merchant 2004 wishes to sell something to consumer 302 at social media web site 304, the checkout process occurs with the merchant 2004 via the social media web site 304 using one of the payment devices from the wallet 1117 in the social media environment. Please note that the selected payment device may or may not have the same brand as that of the PNO; that is, if the PNO is MasterCard International Incorporated, the selected payment device may be a MasterCard card, a Visa card, a Discover card, and so on. The checkout page is shown at 1111 with the specific e-wallet checkout feature at 1113.

One link between this payment process and the process of PNO-SMSO data sharing discussed above is that the consumer may often see an offer he or she wants and click on it; this results in the consumer being directed to the merchant of record. The linkage between the offer and the merchant is depicted at 1115. Offer management services 1115 may correspond, for example, to web services or the like which upload offers to offer services 1119, assist in fulfillment of offers, and so on.

Consider the processes associated with merchant 2004 from a consumer's point of view. Suppose a consumer wants to purchase something from a merchant. In the social network context, it could be something in an on-line game such as a stronger shield, or a virtual tractor in a farming simulation social network game. The consumer selects the desired item from the merchant and proceeds to checkout page 1111. Instead of logging into the merchant's web site, the consumer uses the same user ID and password as for the social network 304 or the e-wallet cloud 1117. The consumer does not need another user ID and password; he or she simply clicks the "buy" button. Because the system already knows who the consumer is, it simply picks the appropriate default payment source from the e-wallet 1117 (an opportunity may also be afforded to the consumer to choose an alternate payment source instead). In some instances, the individual may be making the purchase because he or she received an offer from offer services 1119. Recall the above-discussed example of a purchaser of lumber who is given $20 off an electric drill if purchased today. This purchaser may click on the offer and go back to the corresponding merchant page in the social network environment. This purchaser may log on with the social network or e-wallet cloud user ID and password. The user selects the drill with the $20 off coupon. The user pays the remaining $10 (say the drill was $30 without the $20 coupon) using the default payment mechanism from the e-wallet (or an alternative). The user then obtains the drill at the discounted price based on the offer from offer services 1119.

It should be noted that the person of ordinary skill in the art will be familiar with e-wallets per se, and, given the teachings herein, will be able to adapt same for implementing one or more embodiments of the invention. Non-limiting examples of known e-wallets include the PayPal service (mark of PayPal subsidiary of eBay, Inc., San Jose, Calif., USA); the Checkout by Amazon service (mark of Amazon.com, Inc., Seattle, Wash., USA); and the Google Checkout service (mark of Google, Inc. Mountain View, Calif., USA).

Figure 13:
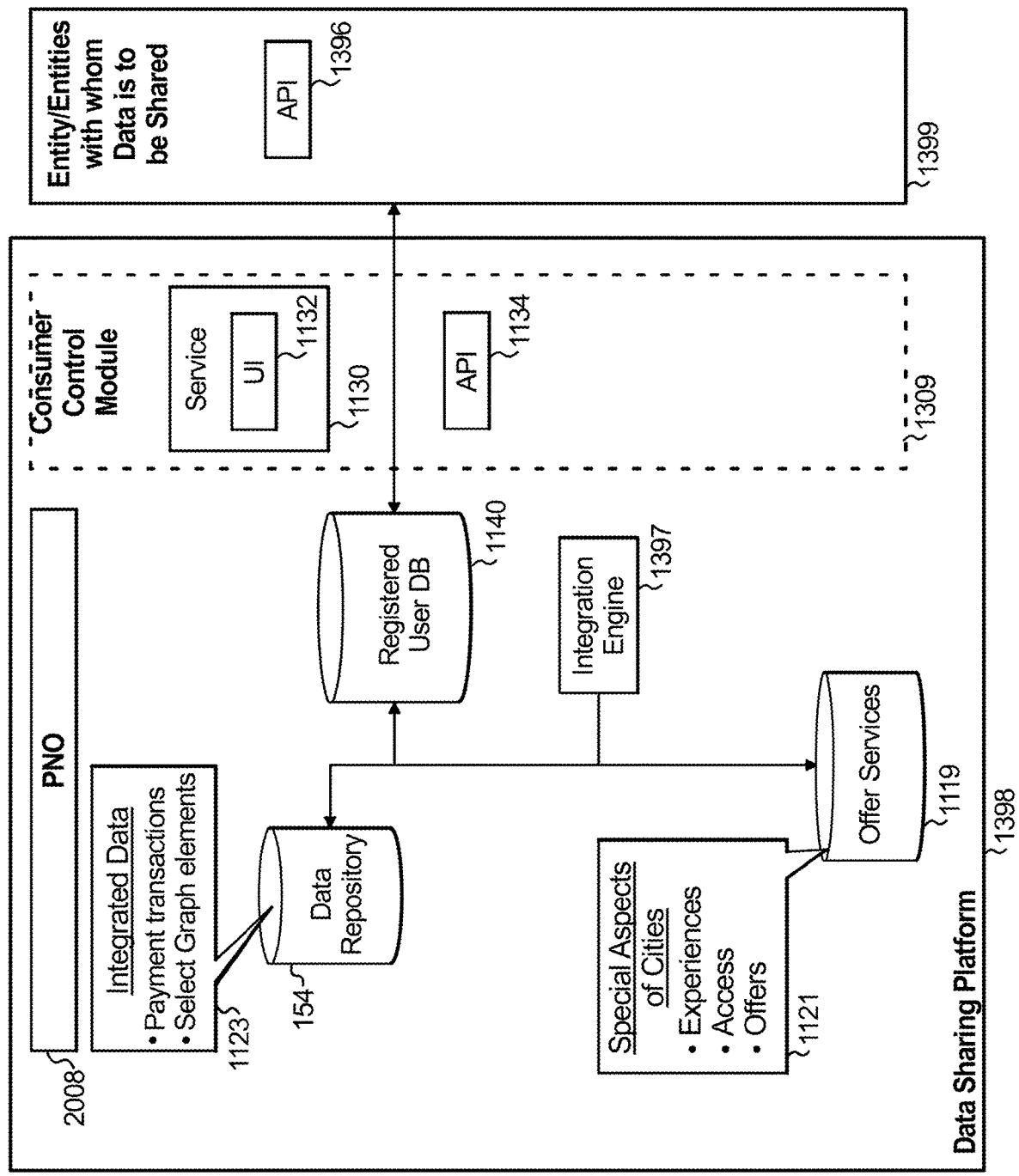
FIG. 13 depicts an exemplary data sharing platform, according to an aspect of the invention.
Figure 16:
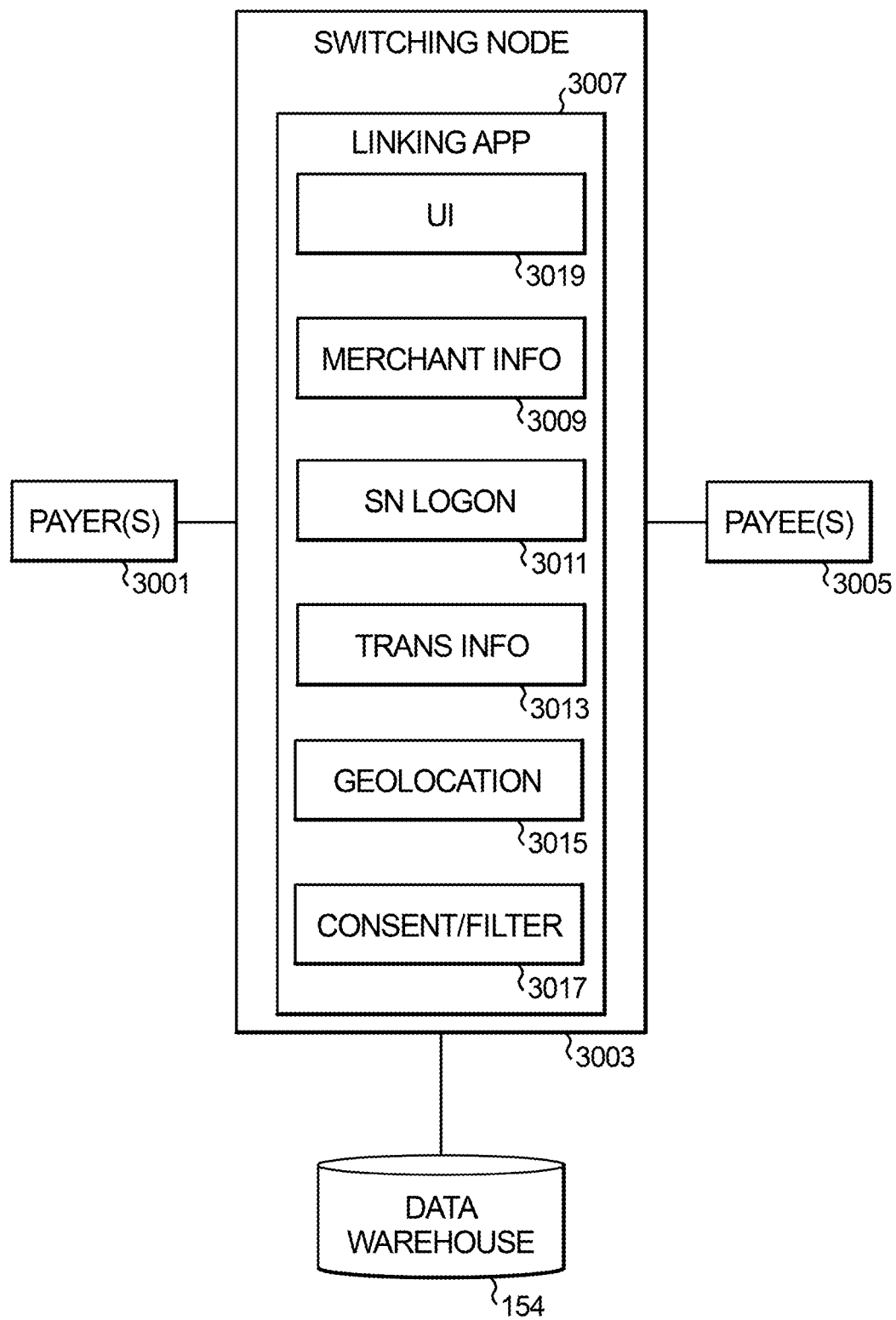
FIG. 16 is an exemplary software architecture diagram.

FIG. 16 shows an exemplary software architecture diagram; any one, some, or all of the modules and/or sub-modules depicted therein may be useful in some instances. The software may be executed at a switching node 3003 within a payment processing network discussed elsewhere herein, or at another location. Interface sub-modules include merchant information sub-module 3009 which provides the merchant's name, chain, address, phone number, web site, and the like; social network logon interface 3011 to permit login access to the social network; transactional information interface 3013 (may have dual functionality including obtaining data and providing data to the site 304 via API, RSS feed, push or pull agents, or the like—can also be separated into a transaction information intake sub-module and a transaction information sharing sub-module); geo-location interface sub-module 3015 which provides coordinates of elements in the payment network, such as ATMs, terminals accepting contactless payments, and the like; and sub-module 3017 for obtaining consent and filtering preferences (what kind of information it is desired to share). In general, the interface sub-modules may implement, for example, APIs. Linking application module 3007, on top of the interface sub-modules, includes configuration and filtering logic; it culls through the transactions and merchant information and publishes the data to site 304 in accordance with the consumer's expressed desires. User interface 3019 may include, for example, a suitable GUI, and is discussed further below. For the avoidance of doubt, FIG. 13 depicts the exemplary software architecture diagram with the software executed at a switching node 3003 within a payment processing network that connects payers 3001 and payees 3005. This is a desirable location for the software. Nevertheless, one or more embodiments involve interaction between an operator of a payment network (e.g. operator of network within which switching node 3003 is located), entities which make payments with the payment network (e.g. payers 3001), and the operator of a social media site 304 or other entities 1399; that is, one or more method steps do not necessarily involve payees 3005.

FIG. 13 shows an exemplary data sharing platform 1398, which can be used in a variety of contexts; for example, to implement sharing of transaction data with third parties—non-limiting examples of such third parties include a social media site, as in the examples shown above; general merchants (the role of merchants as entities from whom transaction data is obtained should be distinguished from the possibility of one or more merchants constituting entities 1399 with whom data is to be shared); and the like. Platform 1398 provides cardholders control over their financial transaction data allowing them, for example, to share chosen transaction data with chosen third parties (generally, entities with whom data is to be shared 1399). The data sharing platform may be operated, for example, by the PNO 2008, and may include some or all of the functionality shown in FIG. 11. The non-limiting example in FIG. 13 shows databases 154, 1119 as discussed above. In the non-limiting embodiment of FIG. 13, no e-wallet is employed; however, the same could be provided in other instances. As shown at 1123, 1121, databases 154, 1119 may have similar content to those described above; in other cases, the content may vary.

Platform 1398 includes consumer control module 1309 and registered user database 1140 discussed further below. Generally, consumer control module 1309 provides cardholders an array of parameters to choose from when selecting what data is acceptable or unacceptable for sharing with one or more entities 1399, such as cardholder approved merchants or social networks. The entities 1399 are trusted and approved by the cardholder and acceptable transaction data may include data that the cardholder does not identify as private or as something the cardholder would like to share. Unacceptable transaction data may include information from a transaction that a cardholder defines as being private or as something the cardholder would not like to share. Consumer control module 1309 includes a web server 1130 hosting a web-based user interface (UI) 1132 that presents a set of parameters to the cardholder from which the cardholder can select to define limits and boundaries on sharing his or her transaction data, based on the cardholder's preferences and privacy concerns. The parameters may also provide cardholders the option to select which entities 1399 are acceptable or unacceptable for data sharing.

Generally, the parameters implement policies so that transaction data stored in data repository 154 will only be shared in accordance with the cardholder's requests or approval. The parameters are stored in a registered user database 1140 for use by PNO 2008 when determining what data can be shared with a particular entity 1399 as permitted by the cardholder. Database 1140 includes tables populated with data sharing preferences of each cardholder, which function as rules to distinguish or filter acceptable data from unacceptable data in any given transaction.

In the non-limiting example of FIG. 13, web-based user interface 1132 accepts inputs from a cardholder and provides output in the form of web pages, which are transmitted over the Internet between web server 1130 and a cardholder's Internet capable device using a web browser program. User interface 1132 presents web pages to the cardholder that include instructions and controls for a cardholder to follow during registration, parameter setting and selection of entities 1399. From a cardholder's perspective, accessing user interface 1132 to select acceptable or unacceptable transaction data simply involves selecting from a set of predefined parameters presented in the form of options or fields, which allow the cardholder to define data, for example, as acceptable/unacceptable or private/not private.

Other data sharing parameters, such as sharing data over a specified time period, a day, a week, a month, or a weekend are also provided as an option in one or more embodiments. As discussed above, there are several methods a cardholder can use to enroll in the data sharing programs, such as enrolling by way of social media site 406, PNO 408 or issuer 410. In this particular example, a cardholder enrolls or registers in a data sharing program using web-based user interface 1132. Platform 1398 enables consumers to control and share their transaction data with suitable entities 1399. In the illustrative embodiment, consumer control module 1309 includes web server 1130 having the hardware and software to deliver web-based user interface 1132 to the cardholders.

To register with the data sharing program platform 1398, a cardholder accesses web server 1130 over the Internet. Web server 1130 presents a registration page where the cardholder can enter his or her card number. In some instances, entry of the card number is all that is required, and data sharing commences from that time forward. In some cases, sharing of transaction data prior to registration may be possible (historical data). Optionally, an additional verification process may be required to share historical data and/or for other purposes. In an optional approach that might be used in some instances, the card number and other personal information, cardholder name, and address are already securely stored in a database, such as data repository 154. During the registration process, the card number is cross-referenced with data stored in data repository 154 to verify that the person enrolling is the named cardholder. After verification, user interface 1132 prompts the cardholder through a process of selecting a user name and a password.

Once enrolled, a cardholder is empowered to select how much or how little data to share with entities 1399. User interface 1132 enables the cardholder to access, use, and control data associated with his or her financial transaction activity and share the data with various entities 1399, such as brick-and-mortar businesses, e-commerce business/on-line services, social media sites, social introduction sites, and the like (again, the role of merchants as entities from whom transaction data is obtained should be distinguished from the possibility of one or more merchants constituting entities 1399 with whom data is to be shared).

In one or more embodiments, data is collected in the normal course of business regardless of whether a particular cardholder enrolls or registers. Registration links the cardholder's name to the card number and allows sharing of data. Entities 1399 with which data is to be shared will typically require some level of integration or registration, including appropriate undertakings to safeguard any data that they are entrusted with. With regard to merchants with whom the cardholder is engaging in transactions, in one or more instances, the process is completely transparent to such merchants and no action is required by them (unless they are also a party 1399 and/or SKU- or UPC-level data is to be shared as discussed below)). The cardholder can select any entity 1399 with which to share data, as long as that entity is participating in the data sharing program (i.e., has completed a suitable registration or integration process, including an undertaking to adequately safeguard shared data (to protect cardholders' privacy, identity and data)—such undertaking may be during registration/integration or at another time, as long as it is prior to any sharing of data). Thus, privacy controls conforming to all applicable laws, rules, regulations, policies and procedures should be employed.

Generally, the data available to the cardholder and chosen merchants is based on transactions and usage associated with the cardholder's payment card. For example, such data may include a purchase amount, a purchase time and/or date, a purchase location, a merchant name, a merchant category (e.g., merchant category code or MCC), a merchant location (including street number, address, city, state, country), a product or service description, a type of goods or services, a product or service ID, an account number, a reference number, or any data related to a transaction that may useful to a cardholder or a cardholder approved third party merchant or entity. The data may also be used, for example, by web server 1130 or an approved third party, to map associations and patterns representing cardholder use that may be further used to generate observable associations and patterns, such as a timeline showing associated card usage with a particular vacation trip route.

User interface 1132 provides, for example, a menu bar and a control panel that offer the cardholder the opportunity select what data is acceptable for use and sharing and with whom. In this embodiment, a dialog box is presented to the cardholder that includes a "builder" section. The builder section assists the cardholder in choosing what data is acceptable for sharing or "not private" status and how to share the data with various entities 1399. The cardholder is presented with various choices, such as, data sharing options (e.g., per transaction) at different levels of detail. For example, a Level 1 data option is presented to the cardholder as L1—Merchant data; a Level 2 data option presented as L2—Merchant plus date data; and a Level 3 data option presented as L3—Merchant plus date plus amount data. A cardholder who only wants to allow a merchant to see where the cardholder shops would select parameter L1. Alternatively, a cardholder who would like to allow, for example, a social media site to have access to "everything," would select parameter L3: namely, merchant name, date of transaction and amount of transaction. Reference is again made to FIG. 5 and accompanying text.

In some cases, the cardholder may be afforded the option to share stock-keeping unit (SKU) or Universal Product Code (UPC) level data; for example, via a personal bar code scanner or scanner 134 discussed above. Currently, SKU- or UPC-level data is not included in standard authorization request (ISO 8583 0100) messages. While, as noted above, integration with merchants in terms of obtaining data is generally not required, merchant integration would be appropriate in one or more embodiments to obtain SKU- or UPC-level data. Thus, some embodiments do involve a merchant registration process for merchants who wish to participate in providing SKU- or UPC-level data. Such data could be provided from the merchant to the PNO via a batch file over the payment network or another network, or via a separate real-time data feed over the payment network or another network, for example.

Given these choices, the cardholder can select a level of data he or she would like to share. The cardholder may also be prompted by the user interface to select participating entities 1399 he would allow to access data. User interface 1132 may also provide a selection of entities participating in the data sharing program and the benefits offered to the cardholders who decide to share their data. For example, an insurance company can offer a cardholder a discount on an insurance policy in exchange for being permitted by the cardholder to review financial transaction data. The data can be used by the insurance company to determine or assist in determining risk, based on, for example, high/low risk living or healthy/unhealthy living. In another example, an entity, such as a restaurant, can offer a loyalty program to cardholders. In this case, a cardholder can select a restaurant to share L1 data (i.e., merchant names). The restaurant can have access to the data to determine how often a cardholder attends the restaurant or how much a cardholder has spent at the restaurant. With this information, the restaurant can determine whether to provide benefits, such as rewards points, to the cardholder.

After the cardholder selects his or her data sharing parameters, the parameters can, for example, be stored in one of the databases in an accessible fashion. In at least some instances, platform 1398 is under the control of PNO 2008 and API 1134 is used for sharing/communication with third parties 1399. In some embodiments, API 1134 is part of consumer control module 1309 and provides the routines and data structures necessary to interface web server 1130 with other entities. Data repository 154 stores transaction data received from one or more acquirers 2006, $A_1, A_2 \ldots A_I$ and may be structured, for example, such as was depicted with regard to data structure 905 (including one or more transaction tables). In some instances, registered user database 1140 stores one or more tables including lists of registered users, their data sharing preferences and other related information, such as secure tokens (discussed further elsewhere herein).

Registered users database 1140 can be structured, for example, as data structures 903 and 907, providing cross-reference tables and merchant information as discussed above. The tables in registered users database 1140 are populated, in part, during the cardholder registration/enrolling process and during the parameter setting process discussed above. The tables are populated, in part, with data (such as flags or other indicia) representing cardholder data sharing parameters selected. After the cardholder selects his or her sharing parameters, the parameters are stored by web server 1130 in registered users database 1140. In particular, the parameters are stored in one or more tables in association with the cardholder account or identity. For example, the parameters are represented in the tables as either a "1" (for acceptable data) or a "0" (for unacceptable data) and are used to distinguish or filter what portion, if not all, of a cardholder's transaction data is acceptable or unacceptable for sharing when a new transaction occurs or past transaction data is requested. As mentioned above, transaction data can include multiple components such as, merchant name, date/time of transaction and item description. If, for example, the cardholder selected parameters allowing only the merchant name be shared, the table is populated with a "1" in association the "merchant name parameter" and a "0" is populated in association with each other parameter, such as "date of transaction parameter," "time of transaction parameter" and "price," etc.

After a cardholder performs a transaction, PNO 2008 receives transaction data from acquirers 2006, $A_1, A_2 \ldots A_I$ (as described in relation to FIG. 2) and stores the data in data repository 1123. As mentioned above, the data can be, for example, a purchase amount, a purchase time, a purchase location, a merchant name, a merchant category, merchant location (including street number, address, city, state, country, or the like), and the like. As discussed further below, in some cases, the merchant location may be looked up in a separate database based on other information. After the data is stored in data repository 1123, PNO 2008 scans tables in registered user database 1140 to determine if the transaction is associated with a card number of a registered or enrolled cardholder. In other words, PNO 2008 checks whether the cardholder of the transaction is enrolled in the data sharing program by searching for the card number in the tables. If the card number is stored in a table, then the parameters associated with card number are read to determine which data from the transaction the cardholder found acceptable for sharing and with whom the data may be shared. PNO 2008 also reads the tables to determine which entity or entities 1399 are entitled to the data. Once determined, web server 1130 sends the information to entity 1399 (for example, by exposing via API 1134), given that entity 1399 is approved by the cardholder to receive such data.

It should also be noted that one or more non-limiting examples are provided wherein transaction data from a payment card is shared with third parties when approved by the cardholder. However, other financial data besides payment card transaction data can also be shared in one or more embodiments.

Thus, in one or more embodiments, transaction data can be provided to a party 1399 in real time or near real time.

A variety of other scenarios are possible. For example, in some cases, an entity 1399 can request the data of one or more enrolled cardholders from the data sharing platform. In this example, an entity 1399 requests data from the data sharing platform 1398 by sending a message that includes, for example, the cardholder's card number and an identifier of the requesting entity. Web server 1130 receives the message and initiates a scan of the tables for the card number. If the card number is found, the entity identifiers associated with the card number are searched for a match to the entity identifier embedded in the request message. If it is found that the entity identifier in the message is matched to an approved entity identifier in a table (indicating that the customer in question has consented to sharing data with this entity), then the associated parameters are read from the tables. The parameters are used to select only cardholder approved data from the transaction data stored in data repository 154. Once selected, the data is made available for use by the entity (e.g., via API 1134) in accordance with the applicable terms and conditions.

Thus, in some instances, when the user swipes the card, the transaction is pushed to the entity 1399 in real time, if the entity desires this. Alternately, the entity 1399 can access the service via the API and obtain the most recent ten (or other predetermined number of) transactions.

An entity 1399 can also request data of one or more enrolled cardholders from the data sharing platform using a secure token. In this example, after a cardholder approves an entity 1399 for data sharing or access to data, web server 1130 generates a secure token associated with the cardholder's card number. The secure token is stored in a table in association with the cardholder's card number and is shared with the entity 1399 for use by the entity 1399 when requesting data from the data sharing platform. The entity 1399 also associates the secure token with the cardholder's identity, such as his or her card number, name or ID, and uses the secure token to gain access to the data that the cardholder agreed to as being acceptable for sharing with the entity 1399. To request data from the data sharing platform 1398, the entity 1399 sends a message with the secure token to web server 1130. A search is made in the tables in registered user database 1140 for a matching secure token. If a matching secure token is found, a search is made in the tables for parameters associated with the secure token to determine what transaction data the cardholder set as acceptable or unacceptable for sharing with the entity 1399 holding the secure token.

The parameters are read and the approved data is made available via API 1132, for use by the entity 1399, in accordance with the applicable terms and conditions.

API 1396 provides for a flow of data from an entity back to the platform 1398. Note that it is shown in association with entity 1399 for illustrative brevity. However, in general, data may be provided to platform 1398 from entities that may or may not be entities with which data is shared. For example, in some embodiments, data is obtained from one or more social media sites which may not necessarily have data shared out to them. Integration engine 1397 integrates and/or links social network data with transaction data, integrates and/or links social network data for two or more individuals, and/or integrates and/or links transaction data for two or more individuals. With regard to integrating and/or linking social network data with transaction data, engine 1397 may include code that when executed causes a processor to query database 154 for the appropriate transaction data, causes appropriate social network data to be obtained (e.g., via API 1396); and/or applies logic as set forth in the pseudo-code elsewhere herein (time or geographic based). With regard to integrating and/or linking social network data for two or more individuals, engine 1397 may include code that when executed causes appropriate social network data to be obtained (e.g., via API 1396); and/or applies logic to query database 1140 for a linkage between two or more individuals so that the appropriate social network data for those individuals is obtained. With regard to integrating and/or linking transaction data for two or more individuals, engine 1397 may include code that when executed causes a processor to query database 154 for the appropriate transaction data; and/or applies logic to:

query database 1140 and/or communicate with a social network (such as via an API 1396)

for a linkage between two or more individuals so that the appropriate transaction data for those individuals is obtained. In some cases, data regarding a social network linkage between two or more individuals may first be obtained from the social network and then stored in database 1140.

Figure 14:
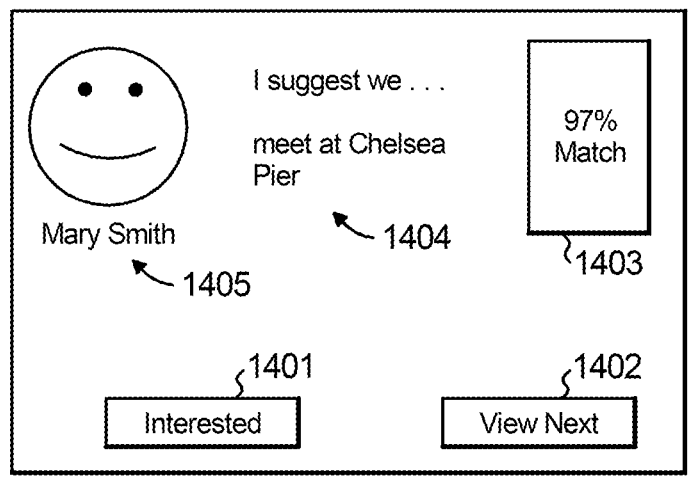
FIG. 14 depicts an exemplary "screen shot" of a social meeting web site using matching data in accordance with an aspect of the invention.

Referring also to FIG. 14, in another example, an entity web site providing a service for matching people of similar interests and/or backgrounds benefits from transaction data shared by cardholders enrolled in both the entity's service and the data sharing platform. In this example, a cardholder enrolled in the data sharing platform accesses the entity web site and registers as a user. After the registration process, the entity web site provides the cardholder the opportunity to enhance his or her "matching" experience by suggesting that the cardholder's transaction data be shared with the entity web site, where the data can be used to match the cardholder to one or more people having similar interests. For example, the cardholder's data may be used to match the cardholder with one or more people who frequent the same places, area of town, sporting events, or concerts, etc. In this embodiment of the invention, if the cardholder elects to share data with the entity, the cardholder is connected to web server 1130 of consumer control platform 1309 where he or she is presented with the web-based user interface 1134.

As in the previous examples, the cardholder can select what data from the cardholder's transaction history and future transactions can be shared with the entity (here, social matching service) web site. For example, web server 1130 presents the cardholder the Level 1 data option (L1—Merchant name data), the Level 2 data option (Merchant name plus date data), and the Level 3 data option (Merchant name plus date plus amount data). Using the above-mentioned "builder" section, the cardholder can build and arrange parameters based on the cardholder's preferences of acceptable and unacceptable data for sharing. When selecting parameters, the cardholder can select the Level 3 data option and add another preference component, such as product name, presented by user interface 1132. The builder provides the cardholder the ability to build different data Level options, for example, a Level 4 data option (L3+ product name). All the levels mentioned herein are exemplary; other embodiments may have more or fewer levels and/or differently-defined levels.

User interface 1132 also presents to the cardholder the option to select timing parameters. For example, using the builder presented by user interface 1132, the cardholder can select L3 data sharing and select a time period in days, months or years to which the L3 data is available to the entity. In this example, after the cardholder assents to sharing data with the entity, the data sharing platform generates a secure token associated with the cardholder's identity, such as card number or ID. The secure token is stored in a table in association with the cardholder's card number and is shared with the entity for use by the entity when requesting data from the data sharing platform. In this example, as long as there is an active token, the entity can have access to the data. The entity also associates the secure token with the cardholder's identity, such as his or her card number, name or ID, and uses the secure token to gain access to the data that the cardholder agreed to as being acceptable for sharing with the entity. To request data from the data sharing platform, the entity sends a message with the secure token to web server 1130. A new message can be generated by the entity every 15 minutes (for example) and sent to the data sharing platform every 15 minutes to receive access to the cardholder's data at 15 minute intervals. This cycle can be any agreed upon cycle by the entity and an operator of the data sharing platform. As noted above, alternatively, data is provided to the entity in real time or near real time.

Web server 1130 receives the secure token and a search is made in registered user database 1140 for a matching token. If a matching token is found, a search is made in the tables for parameters associated with the secure token to determine what transaction data the cardholder set as acceptable or unacceptable for sharing with the entity. The data is sent from the data sharing platform to the entity (or made available via API 1134), in accordance with the applicable terms and conditions.

As seen in FIG. 14, the user may be presented with a profile of Mary Smith 1405 who has suggested to the user a meeting at the Chelsea Pier as shown at 1404. A region 1403 may show a percentage of matching confidence based on the transaction data (and optionally on other factors). A logo may be provided in region 1403 to identify the service offered by platform 1398 as the source of the matching confidence level. The user may be given an option 1401 to express interest or an option 1402 to view the next entry.

Furthermore with regard to this example, a consumer may access the social meeting web site and register and receive a welcome message that invites him or her to share transaction data from platform 1398. The user is told to access his or her account with platform 1398; when doing so, he or she is advised that the social meeting web site is asking for his or her transaction history. The user decides whether to allow this, and if so, what level of data to provide. The platform passes back a token to the social meeting web site, which can then merge that token with the person's identity on their site. Whenever the person comes back to the site, the site can use that token to obtain the person's financial transaction history in accordance with his or her expressed preferences. In one or more embodiments this process can be implemented using OAuth 2.0 authentication. The skilled artisan is familiar with the OAuth 2.0 Authorization Framework from the Internet Engineering Task Force (IETF), and, given the teachings herein, will be able to utilize same to implement one or more embodiments of the invention.

Figure 15:
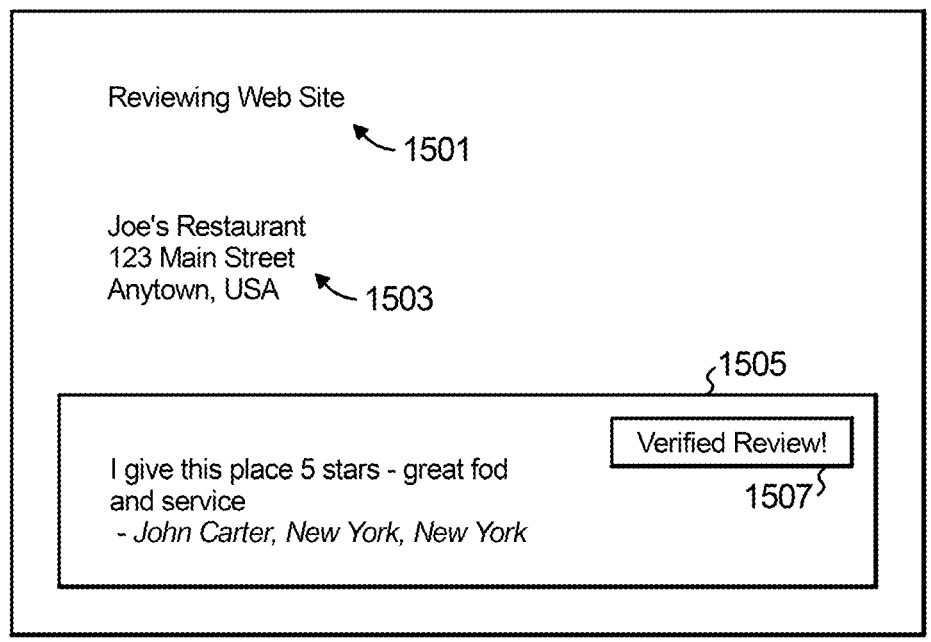
FIG. 15 depicts an exemplary screen shot of a reviewing web site, using a verification process in accordance with an aspect of the invention.

Referring now to FIG. 15, in another example, a cardholder allows an entity access to transaction data to verify a cardholder's post on a web site 1501. For example, many web sites allow for customer reviews of products or services, yet there is no way of determining whether the comments or reviews are based on an actual visit to the place in question or whether a product in question was actually ever used by the individual providing the review. In other words, there is no way of knowing that the comments are valid. One non-limiting example of a reviewing web site is an online urban city guide that helps people find places to eat, shop and relax, based on opinions written by individuals with knowledge or experience of the place in discussion. A discussion can be about a particular restaurant 1503 where individuals post their comments 1505 on the web site about the quality of the food and service at the restaurant. However, it is not really known whether the individuals have actually attended the restaurant. The same is true for product review sections of merchant web sites. It is unknown whether the individual providing an opinion on a product actually has used of the product. In both of these situations, the data sharing platform 1398 can be used to verify whether the individual has been to the restaurant or purchased the product as indicated by the individual's transaction data. In the case of the web site 1501, a cardholder enrolled in the data sharing platform can allow the web site operator to access, for example, L1 data, so as to verify that the cardholder actually went to the restaurant that the cardholder is reviewing. For all cardholders participating in the data sharing program, an indicator 1507, such as a star, oblong, or other shape, can be placed beside the cardholder's post to verify that the cardholder actually made a purchase at the particular restaurant (or other establishment to be rated) at issue. In this case, the data sharing platform improves the reliability of information.

With the example of a product review of a product available from an on-line merchant, a cardholder can select, for example, L3 data option plus, where available, item-level data such as product name. Sharing a product name with the on-line merchant verifies that the cardholder's product review is legitimate or at least based on the cardholder's experience with the product. In a non-limiting exemplary alternative embodiment, web sites can provide links on their web pages allowing viewers to click-through to, for example, a web site associated with the platform 1398 where all verified comments or reviews can be posted for review by anyone.

In another aspect, the data sharing platform 1398 provides cardholders control over their financial transaction data and their social media data allowing them, for example, to combine the data into a timeline or other social media visualization structure. The timeline is a representation of what the cardholder is doing or has done and/or where a cardholder is located or was located at a given time; the time of one or more transactions can be integrated into the timeline in one or more embodiments. The data sharing platform integrates a cardholder's social network data, such as feeds, from one or more social networks with the cardholder's financial transaction data into a timeline. Acting as a central hub for a cardholder's social media account(s), the data sharing platform integrates data from social media accounts, such as Facebook® (registered mark of Facebook, Inc., Menlo Park, Calif., USA), Twitter® (registered mark of Twitter, Inc., San Francisco, Calif., USA) and Instagram® (registered mark of Instagram, Inc., San Francisco, Calif., USA) accounts, with the cardholder's transaction data.

In this example, a cardholder uses consumer control module 1309 to enroll or register with the data sharing platform in the manner described earlier. After enrolling, the cardholder is presented with the opportunity to integrate financial transaction data with social media data, such as posts or network feeds, from social media web sites (which may, in some instances, be selected by the cardholder). As in the earlier examples, the cardholder is given the opportunity to choose what transaction data the cardholder approves as acceptable or unacceptable for sharing. In this example, in addition to or alternatively to sharing of transaction data with one or more social media sites as above, merchant and/or social media sites (and/or sites of other entities) share data with the data sharing platform.

Some aspects thus involve what might be termed a "social shopping site." The user creates an account as described elsewhere herein and the user imports data pertaining to friends and acquaintances from other social network sites. Users share purchases and wish lists. Purchase recommendations are made based on a user's transaction data, the transaction data of the user's friends, and/or the user's wish list. In this aspect, offers are served to users based on a user's transaction data, the transaction data of the user's friends and/or the user's wish list.

Consumer control module 1309 may be operated by the PNO or a third party operator. As in the previous examples, the cardholder is provided the opportunity to choose from a set of parameters from which the cardholder can select to define limits and boundaries on sharing his or her transaction data, based on the cardholder's preferences and privacy concerns. User interface 1132 enables the cardholder to access, use and control data associated with his or her financial transaction activity and share data from various chosen third party entities, such as social networking sites. In some instances, the cardholder can choose from a list of participating social media entities, presented by user interface 1132, with which the cardholder has an account. As in the above examples, after the cardholder selects his or her sharing parameters, the same are stored in registered users database 1140. In particular, the parameters are stored in one or more tables in association with the cardholder account or identity. Using user interface 1132, the cardholder also identifies the social media web site(s) that the data sharing platform can access and stores the merchant identifier(s) of the social media web site(s) in registered user database 1140 in the same manner described in the earlier examples. After the cardholder selects the parameters and social media web sites, web server 1130 sends a message notifying the social media web site of the cardholder's decision to share social media data with the data sharing platform. In response, in some embodiments, the social media web site performs its own verification process and generates a secure token in association with the cardholder's account or identity. The secure token is stored at the social web site and is shared with the data sharing platform for use by the data sharing platform when requesting social media data from the social media web site. Web server 1130 receives the secure token from the social media web site and stores it in registered user database 1140. The secure token is stored in association with the cardholder card number and is used by the data sharing platform to gain access to the social media data of the social media web site. OAuth 2.0, as discussed above, can be used in some embodiments. Other embodiments can use different approaches; for example, as desired by the social media web site operator.

Once authorized by the cardholder, the data sharing platform functions as a central hub to the cardholder's social media data by interfacing with each authorized social media web site account. When the data sharing platform determines or detects that the cardholder engaged in a financial transaction, web server 1130 accesses the cardholder's approved social media web sites and retrieves one or more pertinent cardholder post(s) therefrom. For example, after a cardholder performs a transaction, PNO 2008 receives transaction data from acquirers 2006, $A_1, A_2 \ldots A_I$ (as described in relation to FIG. 2) and stores the data in data repository 154. As mentioned above, the data can be, for example, a purchase amount, a purchase time, a purchase location, a merchant name, a merchant category, merchant location (including street number, address, city, state, country, or the like), etc. Note that in at least some cases, some data may not be present, for example, in an authorization request (ISO 0100) or similar communication, but may be looked up, for example, in a separate database (typically based on information contained in an authorization request (ISO 0100) or similar communication—the merchant location may be handled in this fashion in at least some cases).

After the data is stored in data repository 154, the tables in registered user database 1140 are scanned to determine if the transaction is associated with a card number of a registered or enrolled cardholder. If the card number is stored in a table, then the parameters associated with the card number are read to determine which data from the transaction the cardholder found acceptable for sharing and with whom the data may be shared. The tables are also scanned for secure tokens associated with social media web sites; the secure tokens represent social media web sites approved for sharing data with the data sharing platform (or some other suitable mechanism is employed). If one or more tokens are found, a determination is made as to what data is approved for sharing, and the data and secure token(s) are sent to web server 1130 where the data is stored for later use with the social media data. Web server 1130 sends a message requesting data with the token to the appropriate social media web site server where the secure token is verified (or some other suitable mechanism is used) and if appropriate, the social medial data is sent to web server 1130.

Alternatively, a new message with social media data and the secure token can be generated by the social media web site every 15 minutes (or other predetermined time period) and sent to the data sharing platform every 15 minutes (or other predetermined time period) to update social media data at given intervals. This cycle can be any agreed upon cycle by the social media operator and an operator of the data sharing platform. In this example, web server 1130 receives the secure token and a search is made in the tables in registered user database 1140 for a matching token. If a matching token is found, the tables are searched for parameters associated with the secure token (or other identifier) to determine what transaction data the cardholder set as acceptable or unacceptable for sharing with the merchant and the appropriate transaction data is made available to the web server 1130 for use with the social media data.

Having both the transaction data and social media data, web server 1130 determines whether the posts are related to the transaction data or made at or near the same time of the transaction and combines the posts or other social media entries with authorized transaction data into a single event, where the transaction data is at the core of the event. A variety of different techniques can be employed. In a non-limiting example, an initial determination is based on time; i.e., do the social media post(s) and transaction(s) occur sufficiently close in time to each other (for example, with a certain time window having a predetermined duration such as 5 minutes, 3 hours, 1 day, etc.). Then, the user is afforded an opportunity to confirm the proposed combination. In another non-limiting example, an algorithm-based approach can be employed (e.g., look up merchant location from transaction side; look up geographical location where social media was posted; and apply some type of radius function or the like to determine geographical proximity (e.g., there is correlation if within a 5 mile radius).

The following is pseudo-code for the time based approach:

```
IF
    time of social media post minus time of transaction ≤ threshold1
THEN
    ask user to confirm relationship and GO TO next IF
ELSE
    no relation ship; GO TO CONTINUE
END IF
IF
    user says there is a relationship
THEN
    there is a relationship GO TO CONTINUE
ELSE
    no relationship; GO TO CONTINUE
END IF
CONTINUE
```

The following is pseudo-code for the geographical algorithm approach; user confirmation is optional; threshold2 may be a distance value:

```
look up merchant location from transaction side = location
of transaction;
look up geographical location where social media was posted =
location of social media post
    IF
        location of social media post minus location of
            transaction ≤ threshold2
    THEN
        ask user to confirm relationship and GO TO next IF
    ELSE
        no relation ship; GO TO CONTINUE
    END IF
    IF
        user says there is a relationship
    THEN
        there is a relationship GO TO CONTINUE
    ELSE
        no relation ship; GO TO CONTINUE
    END IF
    CONTINUE
```

Using the posts and transaction data, web server 1130 builds a timeline or other social media data structure for the cardholder based on the transaction(s) or purchase(s). It should be realized that the timeline or combination of transaction data and social media data can be used to predict cardholder interest in future events using predictive modeling. For example, the cardholder may have attended an "ACME BAND" concert or purchased an "ACME BAND" CD in New York several years ago and while the cardholder is travelling in Toronto and making purchases, the transaction data, particularly the merchant address/location data in Toronto, can be used to initiate a search of concerts happening in Toronto around the date of the purchases. If the search reveals that the "ACME BAND" is playing in Toronto, the cardholder can be notified of the concert. The timeline data can also be used to provide specific offers, such as "good only on a specific date," based on an analysis of social media activity. For example, if a person regularly "checks in" at a particular coffee shop on Tuesday, then the cardholder may be offered a coupon for use on a future Tuesday at that same location. Further, a calendar may be created projecting future transactions at certain locations based on past transaction dates and location data and/or social media data.

Furthermore with regard to the timeline aspect, in one or more embodiments, a user creates an account as described elsewhere herein. The user identifies his or her social media accounts for importing. The platform 1398 accesses a user's transaction data and also accesses a user's social media data from the identified accounts. The transaction and social media data is integrated into a timeline. The platform analyzes the timeline data and "predicts the future." The platform may provide offers based on an analysis of social media activity. These timeline aspects have been described as performed by platform 1398 but could also be performed by a separate module.

To monitor the social networks, one or more server instances can be provided to monitor in real time such that as soon as a card is swiped, the platform looks for the cardholder's social network connections. In some instances, a message may be sent to the user's smart phone or other mobile device to inquire whether it is desired to share the transaction data. A suitable "mobile app" or "mobile client" or the like can be used; the timeline is the historical view of the events. Thus, in some instances, the user may be given options—a per-transaction consent, or, when the consumer returns to the app, he or she is shown everything that happened since the last time he or she accessed the application and can consent as a block or individually. A range of settings may be offered.

The aforementioned server instances may try to determine if there is something else interesting going on at the time of the transaction, such that there may be a potential event. Uninteresting transactions may be filtered out, for example. Some level of false positives/false negatives may be present in some cases. In one or more embodiments, if the platform sees a transaction at a brick and mortar merchant, it notes the location, and notes the location of social media posts, and looks for a link. If the brick and mortar purchase is in New York and there is a social media post from St. Louis, fraud may be suspected, so some embodiments can also be used for fraud detection.

Some embodiments can also be used as a forensic tool to understand charges. Embodiments have been described in the context of a consumer-facing application offered to cardholders, but some instances could include a white-label service offered to banks or issuing institutions, in which when an individual looks at his or her transaction history and does not recognize one of the transactions, he or she may click a button and will be shown contemporaneous social media entries to refresh his or her recollection, detect fraud, or the like.

Recapitulation

Given the discussion thus far, it will be appreciated that, in general terms, one or more embodiments contemplate an exemplary method for allowing at least one entity which makes payments with a payment network to share transaction data. One method step includes maintaining a database 154 containing the transaction data from the at least one entity which makes payments with the payment network. Another step includes providing a user interface 1132 which presents the at least one entity which makes payments with the payment network with at least one selection providing consent to sharing of at least a portion of the transaction data with at least one third party. Note that the user interface 1132 may interface directly with the at least one entity which makes payments with the payment network, or via an intermediary (e.g., a third party web site such as a social media web site). Yet another step includes obtaining the consent from the at least one entity which makes payments with the payment network, via the at least one selection (again, directly or indirectly using user interface 1132). The selection may be saved in a database 1140 or 154. Still another step includes interfacing with the at least one third party 1399 to share the at least portion of the transaction data. This can be carried out via API 1134 or another suitable third party interface module using an RSS feed, push and/or pull software agents, and the like. Thus, in a non-limiting example, the interface is established using an application program interface.

In some cases, the maintaining, providing, obtaining, and interfacing steps are carried out by an operator of the payment network. In other cases, one, some, or all of the steps may be carried out by other parties; non-limiting examples include issuers, acquirers, and/or processors.

The term "payment network," as used herein, is intended to refer to an electronic payment network which connects, directly and/or indirectly, payers 3001 (and/or their banks or similar financial institutions) with payees 3005 (and/or their banks or similar financial institutions). The network shown in FIG. 2 is a non-limiting example; other non-limiting examples include automated clearing house/demand deposit payment networks, mobile telephone payment networks, e-commerce business allowing payments and money transfers to be made through the Internet, and the like (it should be noted that the primary purpose of the payment network may not be payment; for example, a mobile telephony network may offer payment network capability even though its primary purpose may be mobile telephony).

Non-limiting exemplary embodiments have been presented herein where the entities which make payments with the payment network are cardholders and the payment network is a payment card type of payment network. It should be noted that cardholders may or may not have physical payment cards—they may have appropriately configured cell phones or the like in addition to, or in lieu of traditional cards, or may have payment-card type accounts with which no physical card is associated. Furthermore, in general, the entities which make payments with the payment network are not limited to cardholders and the payment network is not limited to a payment card type of payment network—indeed, as noted above, the term payment network, as used herein, is intended to refer to an electronic payment network which connects, directly and/or indirectly, payers 3001 (and/or their banks or similar financial institutions) with payees 3005 (and/or their banks or similar financial institutions). The network shown in FIG. 2 is a non-limiting example; other non-limiting examples include automated clearing house/demand deposit payment networks, mobile telephone payment networks, e-commerce business allowing payments and money transfers to be made through the Internet, and the like (it should be noted that the primary purpose of the payment network may not be payment; for example, a mobile telephony network may offer payment network capability even though its primary purpose may be mobile telephony).

In at least some cases, the steps are performed for a plurality of entities that make payments with the payment network.

In one or more embodiments, a data sharing platform 1398 provides a service that allows consumers control over their data if they choose to use it.

In some cases, the user interface 1132 further provides the at least one entity which makes payments with the payment network with at least one selection to specify which given portion of the transaction data is to be shared with the at least one third party. A further step includes obtaining, from the at least one entity which makes payments with the payment network, the at least one selection to specify which given portion of the transaction data is to be shared with the at least one third party. These steps may involve direct or indirect interaction with the at least one entity which makes payments with the payment network, as discussed above. The additional selection may also be saved in a suitable data warehouse 154 or the like. The interfacing can then be carried out in accordance with the at least one selection to specify which given portion of the transaction data is to be shared with the at least one third party.

Furthermore in this regard, the at least one selection could include, for example, merchant identity; merchant identity plus transaction date; and/or merchant identity plus transaction date plus amount; in some cases it may further include item level data.

The third party could include, for example, a social matching web site; a social network; or a rating web site. In the latter case, the at least portion of the transaction data is shared with the rating web site to verify a rating by a given one of the plurality of cardholders.

In some cases, an additional step includes obtaining social network activity data from the social network for the at least one entity which makes payments with the payment network; and integrating the social network activity data and given records of the transaction data, to obtain integrated social media transaction visualization data (e.g., in timeline form, or other suitable form) (for example, using engine 1397). In some cases, at least one of an offer and a prediction is provided based on the integrated data (e.g., from offer services 1119).

In some cases, additional steps include maintaining in the database 154 transaction data from at least a second entity which makes payments with the payment network; and providing at least one offer (e.g., from offer services 1119) to the at least one entity which makes payments with the payment network based on the transaction data of the at least one entity which makes payments with the payment network and the transaction data from the at least second entity which makes payments with the payment network.

As discussed elsewhere herein, in some cases, an additional step includes providing a system, wherein the system includes distinct software modules. Each of the distinct software modules is embodied on at least one non-transitory tangible computer readable recordable storage medium. The distinct software modules include a database module to implement databases 154 and/or 1140, a user interface module 1132 (e.g. a GUI that provides HTML to a user's web browser), and a third party interface module such as API 1134 or alternatives as discussed herein. The steps are then carried out by the corresponding modules executing on at least one hardware processor (e.g., processor 1220 of a server 1200 implementing platform 1398). More generally, the steps may be referred to as implemented by a data sharing platform module.

Furthermore, a system (e.g., a data sharing platform) can include a memory 1230 (e.g., RAM, cache, on-chip registers); at least one processor 1280 operatively coupled to the memory; and a persistent storage device (hard drive, thumb drive, etc.) operatively coupled to the memory and storing in a non-transitory manner instructions which when loaded into the memory cause the at least one processor to be operative to carry out or otherwise facilitate any one, some, or all of the method steps described herein. The instructions may be broken down, for example, into the aforementioned distinct software modules and/or sub-modules.

Even further, an article of manufacture including a computer program product for implementing one or more techniques disclosed herein includes a tangible computer-readable recordable storage medium, storing in a non-transitory manner computer readable program code. The computer readable program code includes computer readable program code configured to carry out or otherwise facilitate any one, some, or all of the method steps described herein. The computer readable program code may be broken down, for example, into the aforementioned distinct software modules and/or sub-modules.

Given the discussion thus far, it will be appreciated that, in general terms, an exemplary method for providing integrated social media transaction visualization data includes the step of maintaining a database 154 containing transaction data from at least one entity which makes payments with a payment network. Another step includes obtaining social network activity data from a social network for the at least one entity which makes payments with the payment network. This can be carried out with a suitable third party interface module such as API 1396 and/or social network logon 1311 (other data feeds, push/pull agents, etc. are also possible). A still further step includes integrating (e.g., with engine 1397) the social network activity data and given records of the transaction data, to obtain integrated social media transaction visualization data.

In some cases, an additional step includes an additional step includes providing at least one of an offer and a prediction based on the integrated social media transaction visualization data (e.g., from offer services 1119).

In some embodiments, the steps are carried out by an operator of the payment network (refer to broad definition above); again, the steps may be carried out by other entities such as issuers, acquirers, and/or processors.

In at least some instances, the database is maintained for transactions of a plurality of entities that make payments with the payment network.

The records that are maintained can include merchant identity; merchant identity plus transaction date; and/or merchant identity plus transaction date plus amount; as noted above, in some cases, item level data is also included.

In some instances, further steps include maintaining in the database 1123 transaction data from at least a second entity which makes payments with the payment network (this entity and the first entity are typically registered users in database 1140); and providing at least one offer (e.g., from offer services 1119) to the at least one entity which makes payments with the payment network based on the transaction data of the at least one entity which makes payments with the payment network and the transaction data from the at least second entity which makes payments with the payment network.

In some cases, a further step includes obtaining social network activity data from a social network for the at least second entity which makes payments with the payment network. In general, this may be the same or a different social network. The at least one offer is further based on the social network activity data for the at least second entity which makes payments with the payment network.

As discussed elsewhere herein, in some cases, an additional step includes providing a system, wherein the system includes distinct software modules. Each of the distinct software modules is embodied on at least one non-transitory tangible computer readable recordable storage medium. The distinct software modules include a database module to implement databases 154 and/or 1140, a third party interface module such as 1396 or alternatives described herein, and an integration engine module 1397. The steps are then carried out by the corresponding modules executing on at least one hardware processor (e.g., processor 1220 of a server 1200 implementing a suitable platform). More generally, the steps may be referred to as implemented by an integrated visualization platform module (may be part of data sharing platform 1398 or may omit the outbound sharing functionality thereof). A user interface module 1132 is optionally provided to convey offers or other recommendations to the user.

Furthermore, a system (e.g., an integrated visualization platform) can include a memory 1230 (e.g., RAM, cache, on-chip registers); at least one processor 1280 operatively coupled to the memory; and a persistent storage device (hard drive, thumb drive, etc.) operatively coupled to the memory and storing in a non-transitory manner instructions which when loaded into the memory cause the at least one processor to be operative to carry out or otherwise facilitate any one, some, or all of the method steps described herein. The instructions may be broken down, for example, into the aforementioned distinct software modules and/or sub-modules.

Again, even further, an article of manufacture including a computer program product for implementing one or more techniques disclosed herein includes a tangible computer-readable recordable storage medium, storing in a non-transitory manner computer readable program code. The computer readable program code includes computer readable program code configured to carry out or otherwise facilitate any one, some, or all of the method steps described herein. The computer readable program code may be broken down, for example, into the aforementioned distinct software modules and/or sub-modules.

In another aspect, an exemplary method for providing purchase recommendations includes the step of maintaining a database 154 containing transaction data from at least first and second entities which make payments with a payment network. A further step includes linking the transaction data from the at least first and second entities based on social media connectivity (e.g., with integration engine 1397). An even further step includes providing at least one purchase recommendation to the at least first entity which makes payments with the payment network based on the linked transaction data (e.g., from offer services 1119; the offer may be presented, for example, via UI 1132).

It should be noted that, for example, where sharing with entities 1399 is not carried out, UI 1132 may optionally be provided independently of consumer control module 1309.

In some cases, the method further includes obtaining social network activity data from at least one social network for at least one of the first and second entities which make payments with the payment network. The at least one offer is then further based on the social network activity data.

The above comments on provision of a system including distinct software modules are also applicable here; the modules could include, for example, a database module as described above, an integration engine module to implement engine 1397; a user interface module 1132, and an offer services module to implement offer services 1119. The comments on systems and articles of manufacture are also applicable here; the pertinent platform may be referred to, for example, as a purchase recommendation platform.

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126; a reader 132; payment devices such as cards 102, 112; a host, server, and/or processing center 140, 142, 144 (optionally with data warehouse 154) of a merchant, issuer, acquirer, processor, or operator of a network 2008 operating according to a payment system standard (and/or specification), as well as in connection with the blocks and/or sub-blocks in FIG. 13; the blocks and/or sub-blocks 3007-3017 of FIG. 16; and/or the blocks and/or sub-blocks in any of the other pertinent figures. Firmware might be employed, for example, in connection with payment devices such as cards 102, 112 and reader 132. Firmware provides a number of basic functions (e.g., display, print, accept keystrokes) that in themselves do not provide the final end-use application, but rather are building blocks; software links the building blocks together to deliver a usable solution.

Figure 12:
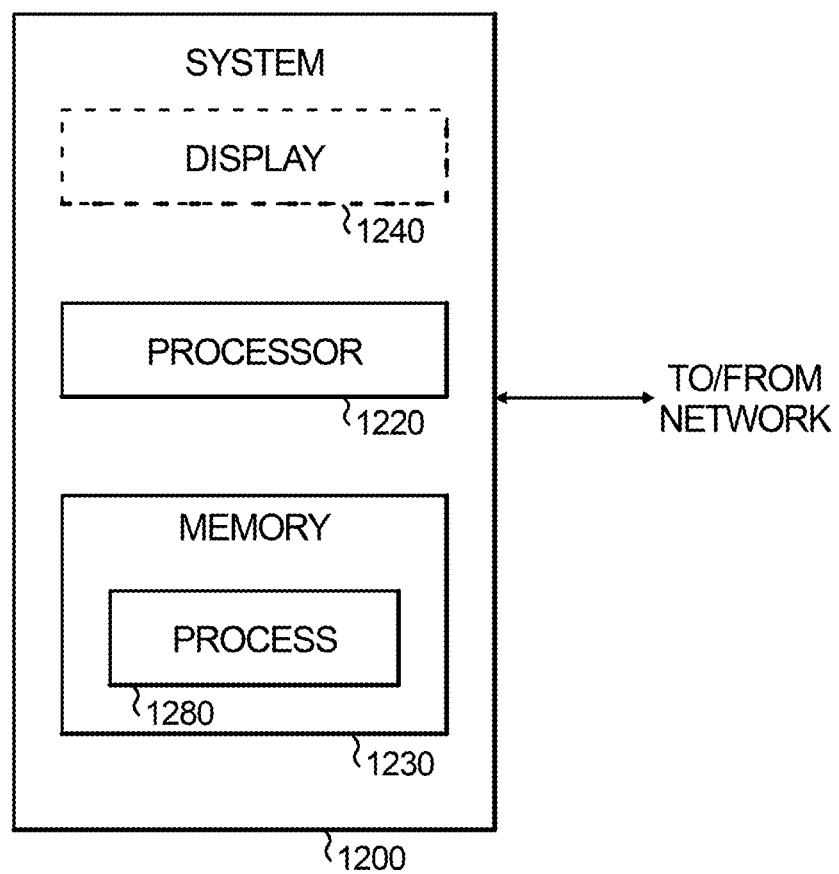
FIG. 12 is a block diagram of an exemplary computer system useful in one or more embodiments of the invention.

FIG. 12 is a block diagram of a system 1200 that can implement part or all of one or more aspects or processes of the invention. As shown in FIG. 12, memory 1230 configures the processor 1220 (which could correspond, e.g., to processor portions 106, 116, 130; processors of remote hosts in centers 140, 142, 144; processors of servers implementing blocks and/or sub-blocks in FIG. 13; the blocks and/or sub-blocks 3007-3017 of FIG. 16; and/or the blocks and/or sub-blocks in any of the other pertinent figures, and the like) to implement one or more aspects of the methods, steps, and functions disclosed herein (collectively, shown as process 1280 in FIG. 12). Different method steps can be performed by different processors. The memory 1230 could be distributed local and the processor 1220 could be distributed or singular. The memory 1230 could be implemented as an electrical, magnetic or optical memory, or any combination of these or other types of storage devices (including memory portions as described above with respect to cards 102, 112). It should be noted that if distributed processors are employed, each distributed processor that makes up processor 1220 generally contains its own addressable memory space. It should also be noted that some or all of computer system 1200 can be incorporated into an application-specific or general-use integrated circuit. For example, one or more method steps could be implemented in hardware in an ASIC rather than using firmware. Display 1240 is representative of a variety of possible input/output devices (e.g., displays, mice, keyboards, and the like).

The notation "to/from network" is indicative of a variety of possible network interface devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a SMSO's infrastructure and another device could be a physical memory media associated with a processing center of a PNO. As used herein, a tangible computer-readable recordable storage medium is intended to encompass a non-transitory recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 140, 142, 144, 2008 or sub-portions thereof; 1399, 3003, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 140, 142, 144; blocks and/or sub-blocks in FIG. 13; the blocks and/or sub-blocks 3007-3017 of FIG. 16; and/or the blocks and/or sub-blocks in any of the other pertinent figures can make use of computer technology with appropriate instructions to implement method steps described herein. The various platforms can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 1200 as shown in FIG. 12) running a server program. It will be understood that such a physical server may or may not include a display, keyboard, or other input/output components. A "host" includes a physical data processing system (for example, system 1200 as shown in FIG. 12) running an appropriate program. It will be understood that such a host may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include modules to implement the blocks and/or sub-blocks in FIG. 13; the blocks and/or sub-blocks 3007-3017 of FIG. 16; and/or the blocks and/or sub-blocks in any of the other pertinent figures (data warehouse 154 may also include software and appropriate physical persistent storage).

The following are non-limiting examples of modules may be employed in combination in different embodiments; other embodiments may "mix and match" or may have more, fewer, and/or different modules:

a database module, a user interface module, and a third party interface module;

a database module, a third party interface module, and an integration engine module;

a database module, an integration engine module; a user interface module, and an offer services module.

The blocks may be implemented by the software modules together with corresponding memories and one or more processors. The modules can run, for example on one or more hardware processors of one or more servers; in general, all could run on the same server, each could run on a separate server, and so on. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 2008, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, JavaScript or other ECMAScript based scripting languages, and the like (an exemplary and non-limiting list), and can also make use of, for example, Extensible Markup Language (XML), JSON, name/value pairs, known application programs such as relational database applications, spreadsheets, and the like. As noted, in some instances, APIs can be implemented in third generation languages such as C++, Perl, and JSON. The computers can be programmed to implement the logic depicted in the flow charts and other figures. At least some messages, in at least some instances, can be in accordance with ISO 8583.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for providing integrated social media transaction visualization data at a switching node of an open payment processing network, said method comprising the steps of:

maintaining a database coupled to said switching node and containing payment card transaction data from at least one payment card account holder who makes payments with said open payment processing network configured to facilitate transactions between multiple issuers and multiple acquirers, said switching node being between said multiple issuers and said multiple acquirers in said open payment processing network, said maintaining being carried out by an operator of said open payment processing network via a database module embodied on at least one non-transitory computer readable medium, executing on at least one hardware processor located at said switching node in said open payment processing network, said payment card transaction data comprising data for transactions made by said at least one payment card account holder with said open payment processing network and involving at least two of said multiple acquirers;

obtaining from a social network a plurality of social network posts made by said at least one payment card account holder who makes payments with said open payment processing network, said obtaining being carried out via a third party interface module embodied on said at least one non-transitory computer readable medium, executing on said at least one hardware processor;

integrating particular ones of said social network posts and particular records of said payment card transaction data, to obtain integrated social media transaction visualization data, said integrating being carried out with an integration engine module embodied on said at least one non-transitory computer readable medium, executing on said at least one hardware processor; and publishing at least a portion of said integrated social media transaction visualization data on behalf of said at least one payment card account holder, said publishing being carried out with a user interface module embodied on said at least one non-transitory computer readable medium, executing on said at least one hardware processor;

wherein said step of said integration engine module integrating said particular ones of said social network posts and said particular records of said transaction data comprises associating, in said social media transaction visualization data, at least a particular one of said plurality of social network posts made by said at least one payment card account holder with at least a particular one of said transactions made by said at least one payment card account holder with said open payment processing network; and wherein at least the particular one of the plurality of social network posts and at least the particular one of said transactions are both made by said at least one payment card account holder prior to said step of said integration engine module integrating said particular ones of said social network posts and said particular records of said transaction data and prior to said step of publishing at least said portion of said integrated social media transaction visualization data on behalf of said at least one payment card account holder;

wherein, in said obtaining step, said third party interface module comprises a plurality of application program interfaces within a native user interface of said social network, coupled to said database via a secure cloud service, and said obtaining is carried out using said plurality of application program interfaces within said native user interface of said social network, in accordance with preferences of said at least one payment card account holder;

wherein said publishing at least said portion of said integrated social media transaction visualization data is limited to categories of transactions specified by said at least one payment card account holder; and wherein said particular one of said plurality of social network posts comprises a review of a merchant, product, and/or service.

2. The method of claim 1, wherein, in said integrating step, said particular records comprise at least one of:
merchant identity;
merchant identity plus transaction date;
merchant identity plus transaction date plus amount.

3. The method of claim 2, wherein, in said integrating step, said particular records further comprise item level data.

4. The method of claim 1, further comprising:
maintaining in said database payment card transaction data from at least a second payment card account holder who makes payments with said open payment processing network, said maintaining of said payment card transaction data for said at least second payment card account holder also being carried out by said operator of said open payment processing network via said database module embodied on said at least one non-transitory computer readable medium, executing on said at least one hardware processor located at said switching node in said open payment processing network, said payment card transaction data for said at least second payment card account holder comprising data for transactions made by said at least second payment card account holder with said open payment processing network; and providing at least one offer to said at least one payment card account holder who makes payments with said open payment processing network based on said payment card transaction data of said at least one payment card account holder who makes payments with said open payment processing network and said transaction data from said at least second payment card account holder who makes payments with said open payment processing network.

5. The method of claim 4, further comprising obtaining from said social network a plurality of social network posts made by said at least second payment card account holder who makes payments with said open payment processing network; wherein said at least one offer is further based on said social network posts made by said at least second payment card account holder who makes payments with said open payment processing network.

6. A system for providing integrated social media transaction visualization data at a switching node of an open payment processing network, said system comprising:
a memory;
at least one processor, located at said switching node in said open payment processing network configured to facilitate transactions between multiple issuers and multiple acquirers, said switching node being between said multiple issuers and said multiple acquirers in said open payment processing network, said at least one processor being operatively coupled to said memory; and
a persistent storage device operatively coupled to said memory and storing in a non-transitory manner instructions comprising distinct software modules, said distinct software modules in turn comprising a database module, a third party interface module, an integration engine module, and a user interface module, which instructions, when loaded into said memory, cause said at least one processor to be operative to:
maintain a database coupled to said switching node and containing payment card transaction data from at least one payment card account holder who makes payments with said open payment processing network, said maintaining being carried out via said database module executing on said at least one processor, said payment card transaction data comprising data for transactions made by said at least one payment card account holder with said open payment processing network and involving at least two of said multiple acquirers;
obtain from a social network a plurality of social network posts made by said at least one payment card account holder who makes payments with said open payment processing network, said obtaining being carried out via said third party interface module executing on said at least one processor;

integrate particular ones of said social network posts and particular records of said payment card transaction data, to obtain integrated social media transaction visualization data, said integrating being carried out with said integration engine module, executing on said at least one processor; and publish at least a portion of said integrated social media transaction visualization data on behalf of said at least one payment card account holder, said publishing being carried out via said user interface module executing on said at least one processor;

wherein said integrating comprises associating, in said social media transaction visualization data, at least a particular one of said plurality of social network posts made by said at least one payment card account holder with at least a particular one of said transactions made by said at least one payment card account holder with said open payment processing network; and wherein at least the particular one of the plurality of social network posts and at least the particular one of said transactions are both made by said at least one payment card account holder prior to said integrating and said publishing;

wherein said third party interface module comprises a plurality of application program interfaces within a native user interface of said social network, coupled to said database via a secure cloud service, and said social network posts are obtained using said plurality of application program interfaces within said native user interface of said social network, in accordance with preferences of said at least one payment card account holder;

wherein said published at least portion of said integrated social media transaction visualization data is limited to categories of transactions specified by said at least one payment card account holder; and wherein said particular one of said plurality of social network posts comprises a review of a merchant, product, and/or service.

7. A non-transitory computer readable medium comprising computer executable instructions for providing integrated social media transaction visualization data at a switching node of an open payment processing network, said instructions comprising distinct software modules, said distinct software modules in turn comprising a database module, a third party interface module, an integration engine module, and a user interface module, which instructions, when executed by a computer located at said switching node in said open payment processing network configured to facilitate transactions between multiple issuers and multiple acquirers, said switching node being between said multiple issuers and said multiple acquirers in said open payment processing network, cause the computer to perform the method of:

maintaining, with said database module, a database coupled to said switching node and containing payment card transaction data from at least one payment card account holder who makes payments with said open payment processing network, said payment card transaction data comprising data for transactions made by said at least one payment card account holder with said open payment processing network and involving at least two of said multiple acquirers;

obtaining, via said third party interface module, from a social network a plurality of social network posts made by said at least one payment card account holder who makes payments with said open payment processing network;

integrating, with said integration engine module, particular ones of said social network posts and particular records of said payment card transaction data, to obtain integrated social media transaction visualization data; and publishing, via said user interface module, at least a portion of said integrated social media transaction visualization data on behalf of said at least one payment card account holder;

wherein integrating said particular ones of said social network posts and said particular records of said transaction data comprises associating, in said social media transaction visualization data, at least a particular one of said plurality of social network posts made by said at least one payment card account holder with at least a particular one of said transactions made by said at least one payment card account holder with said open payment processing network; and wherein at least the particular one of the plurality of social network posts and at least the particular one of said transactions are both made by said at least one payment card account holder prior to said step of said integration engine module integrating said particular ones of said social network posts and said particular records of said transaction data and prior to said step of said user interface module publishing at least said portion of said integrated social media transaction visualization data on behalf of said at least one payment card account holder;

wherein, in said obtaining step, said third party interface module comprises a plurality of application program interfaces within a native user interface of said social network, coupled to said database via a secure cloud service, and said obtaining is carried out using said plurality of application program interfaces within said native user interface of said social network, in accordance with preferences of said at least one payment card account holder;

wherein said publishing at least said portion of said integrated social media transaction visualization data is limited to categories of transactions specified by said at least one payment card account holder; and wherein said particular one of said plurality of social network posts comprises a review of a merchant, product, and/or service.

8. An apparatus for providing integrated social media transaction visualization data at a switching node of an open payment processing network, said apparatus comprising:

means for maintaining a database coupled to said switching node and containing payment card transaction data from at least one payment card account holder who makes payments with said open payment processing network configured to facilitate transactions between multiple issuers and multiple acquirers, said switching node being between said multiple issuers and said multiple acquirers in said open payment processing network, said maintaining being carried out by an operator of said open payment processing network via a database module embodied on at least one non-transitory computer readable medium, executing on at least one hardware processor located at said switching node in said open payment processing network, said payment card transaction data comprising data for transactions made by said at least one payment card account holder with said open payment processing network and involving at least two of said multiple acquirers;

means for obtaining from a social network a plurality of social network posts made by said at least one payment card account holder who makes payments with said open payment processing network, said obtaining being carried out via a third party interface module embodied on said at least one non-transitory computer readable medium, executing on said at least one hardware processor;

means for integrating particular ones of said social network posts and particular records of said payment card transaction data, to obtain integrated social media transaction visualization data, said integrating being carried out with an integration engine module embodied on said at least one non-transitory computer readable medium, executing on said at least one hardware processor; and means for publishing at least a portion of said integrated social media transaction visualization data on behalf of said at least one payment card account holder, said publishing being carried out with a user interface module embodied on said at least one non-transitory computer readable medium, executing on said at least one hardware processor;

wherein said integrating comprises associating, in said social media transaction visualization data, at least a particular one of said plurality of social network posts made by said at least one payment card account holder with at least a particular one of said transactions made by said at least one payment card account holder with said open payment processing network; and
    wherein at least the particular one of the plurality of social network posts and at least the particular one of said transactions are both made by said at least one payment card account holder prior to s aid integrating and said publishing;

wherein said third party interface module comprises a plurality of application program interfaces within a native user interface of said social network, coupled to said database via a secure cloud service, and said obtaining is carried out using said plurality of application program interfaces within said native user interface of said social network, in accordance with preferences of said at least one payment card account holder;

wherein said publishing at least said portion of said integrated social media transaction visualization data is limited to categories of transactions specified by said at least one payment card account holder; and wherein said particular one of said plurality of social network posts comprises a review of a merchant, product, and/or service.

9. The method of claim 1, wherein:

said plurality of social network posts comprises time values of said plurality of social network posts made by said at least one payment card account holder;

said payment card transaction data comprises time values of said transactions made by said at least one payment card account holder with said open payment processing network; and said step of said integration engine module integrating said social network posts and said particular records of said transaction data comprises:
    determining whether said particular one of said plurality of social network posts occurred within a time threshold of said particular one of said transactions made by said at least one payment card account holder with said open payment processing network; and
    if said determining is affirmative, associating said particular one of said plurality of social network posts by said at least one payment card account holder with said particular one of said transactions made by said at least one payment card account holder with said open payment processing network.

10. The method of claim 1, wherein:

said plurality of social network posts comprises geographical location values of said plurality of social network posts by said at least one payment card account holder;

said payment card transaction data comprises geographical location values of said transactions made by said at least one payment card account holder with said open payment processing network; and said step of said integration engine module integrating said social network posts and said particular records of said transaction data comprises:
    determining whether said particular one of said plurality of social network posts occurred within a location threshold of said particular one of said transactions made by said at least one payment card account holder with said open payment processing network; and
    if said determining is affirmative, associating said particular one of said plurality of social network posts by said at least one payment card account holder with said particular one of said transactions made by said at least one payment card account holder with said open payment processing network.

11. The method of claim 1, wherein said step of said integration engine module integrating said social network posts and said particular records of said transaction data comprises:
    determining whether a particular one of said plurality of social network posts occurred within at least one of a time threshold and a location threshold of a particular one of said transactions made by said at least one payment card account holder with said open payment processing network; and
    if said determining is affirmative, associating said particular one of said plurality of social network posts by said at least one payment card account holder with said particular one of said transactions made by said at least one payment card account holder with said open payment processing network in said social media transaction visualization data.

12. The method of claim 1, further comprising:

verifying said review if said particular one of said transactions comprises at least one of:

a purchase from said merchant; and a purchase of said product and/or service.

13. The method of claim 1, further comprising verifying said review if said particular one of said transactions comprises a purchase of said product or service from said merchant.

14. The method of claim 1, further comprising determining that said review is either favorable or unfavorable.

15. The method of claim 14, further comprising at least one of:
  responsive to a determination that said review is favorable, targeting said at least one payment card account holder with an advertisement analogizing another merchant, product, or service to the reviewed merchant, product, or service; and
  responsive to a determination that said review is unfavorable, targeting said at least one payment card account holder with an advertisement distinguishing another merchant, product, or service from the reviewed merchant, product, or service.

16. The method of claim 1, wherein said step of said integration engine module integrating said social network posts and said particular records of said transaction data comprises determining that said particular one of said plurality of transactions is either personal or business-related, said determining being based at least in part on said particular one of said social network posts associated with said particular one of said plurality of transactions.

17. The method of claim 1, further comprising, based at least in part on said integrated social media transaction visualization data, predicting at least one of a geographic location and a time of at least one future transaction by said at least one payment card account holder.

18. The method of claim 17, further comprising targeting said at least one payment card account holder with a specific promotion based at least in part on said predicted at least one of geographic location and time.

19. The method of claim 1, further comprising determining at least one risk level associated with a lifestyle of said at least one payment card account holder based at least in part on said integrated social media transaction visualization data.

20. The method of claim 9, further comprising automatically characterizing said particular one of said transactions as potentially fraudulent when a geographic location of said particular one of said transactions is inconsistent with a geographic location of said particular one of said social media posts occurring within said time threshold of said particular one of said transactions.

21. The method of claim 20, further comprising, responsive to characterization of said particular one of said transactions as potentially fraudulent, displaying said particular one of said social media posts associated with said particular one of said transactions to facilitate validation of said transaction.

* * * * *